(12) United States Patent
Balboni et al.

(10) Patent No.: US 7,939,005 B2
(45) Date of Patent: May 10, 2011

(54) APPARATUSES FOR FORMING OBJECTS WITH UNDERCUT PORTIONS

(75) Inventors: Alessandro Balboni, Granarolo dell'Emilia (IT); Maurizio Borgatti, Imola (IT); Zeno Zuffa, Borgo Tossignano (IT)

(73) Assignee: Sacmi Cooperativa Meccanici Imola Societa' Cooperativa, Imola (BO) (IT)

( * ) Notice: Subject to any disclaimer, the term of this patent is extended or adjusted under 35 U.S.C. 154(b) by 357 days.

(21) Appl. No.: 11/990,308

(22) PCT Filed: Aug. 1, 2006

(86) PCT No.: PCT/EP2006/064921
§ 371 (c)(1),
(2), (4) Date: May 14, 2008

(87) PCT Pub. No.: WO2007/017418
PCT Pub. Date: Feb. 15, 2007

(65) Prior Publication Data
US 2009/0140462 A1 Jun. 4, 2009

(30) Foreign Application Priority Data
Aug. 10, 2005 (IT) .............................. MO2005A0212

(51) Int. Cl.
*B29C 43/00* (2006.01)
(52) U.S. Cl. ..................... 264/318; 425/348 R; 425/408; 425/412
(58) Field of Classification Search .................. 425/408, 425/412, 348 R, 349; 264/318; 65/310, 65/260, 304, 318, 319, 355, 356; 74/53–56, 567, 569
See application file for complete search history.

(56) References Cited

U.S. PATENT DOCUMENTS

| | | | | |
|---|---|---|---|---|
| 2,980,960 | A | * | 4/1961 | Cropp ............................. 425/151 |
| 3,778,213 | A | * | 12/1973 | Di Settembrini ............. 425/532 |
| 3,864,981 | A | * | 2/1975 | Schlegel ............................. 74/55 |
| 4,529,372 | A | | 7/1985 | Saumsiegel |
| 5,932,155 | A | | 8/1999 | Ingram |
| 6,416,312 | B1 | * | 7/2002 | Gonser et al. ................. 425/525 |

FOREIGN PATENT DOCUMENTS

| | | |
|---|---|---|
| WO | WO 03/072333 A1 | 9/2003 |
| WO | WO 2005/058572 A1 | 6/2005 |
| WO | WO-2006/040630 A2 * | 4/2006 |

OTHER PUBLICATIONS

International Search Report for PCT/EP2006/064921 mailed Mar. 26, 2007.
International Preliminary Report on Patentability for PCT/EP2006/064921.

* cited by examiner

*Primary Examiner* — Joseph S Del Sole
*Assistant Examiner* — James Sanders
(74) *Attorney, Agent, or Firm* — Nixon & Vanderhye P.C.

(57) ABSTRACT

An apparatus for forming an object from a dose of plastics comprises a die arrangement provided with a cavity for receiving said dose and with at least two parts that are reciprocally movable for shaping an undercut portion of said object, at least one fluid for applying a clamping force so as to keep said at least two parts in contact; said at least one fluid is such as to increase discontinuously said clamping force from an initial force that is applicable when said dose is substantially contained in said cavity to a final force applicable when said at least two parts shape said undercut portion.

85 Claims, 16 Drawing Sheets

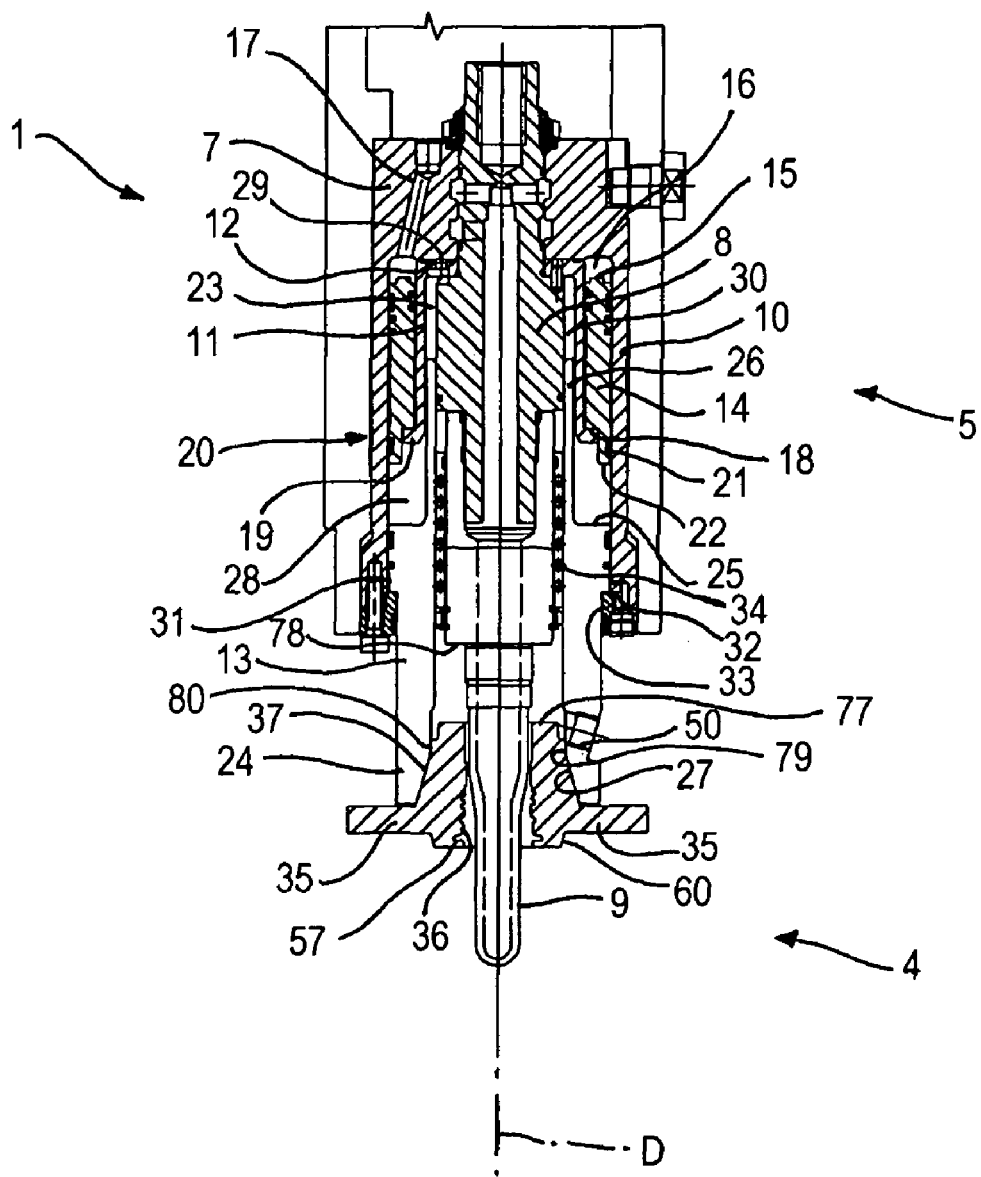
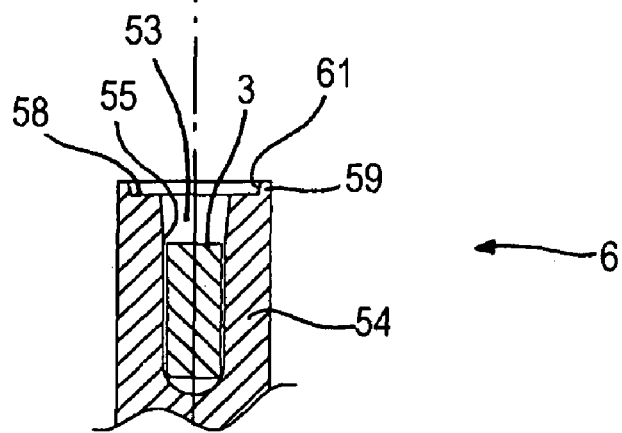
Fig. 1

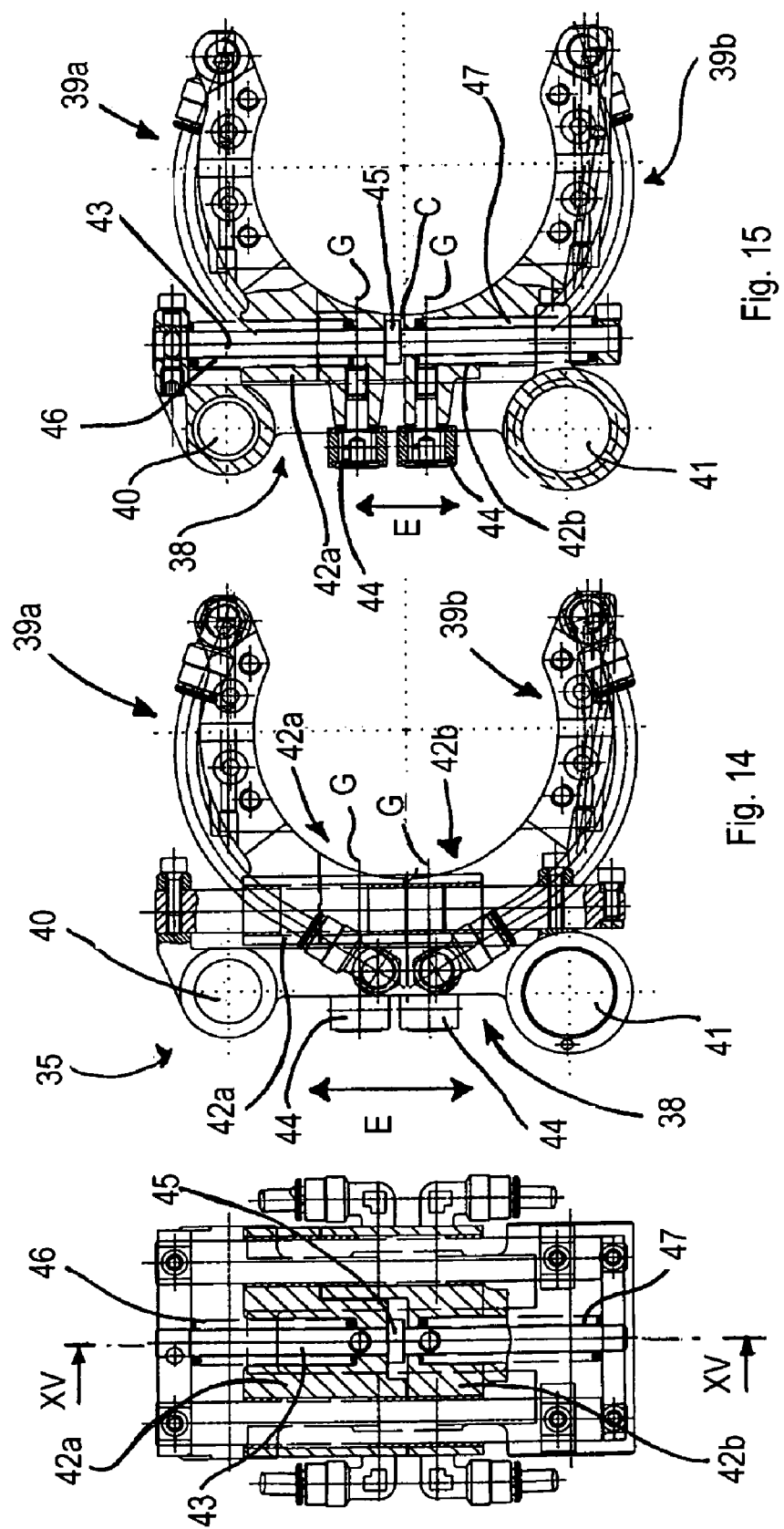

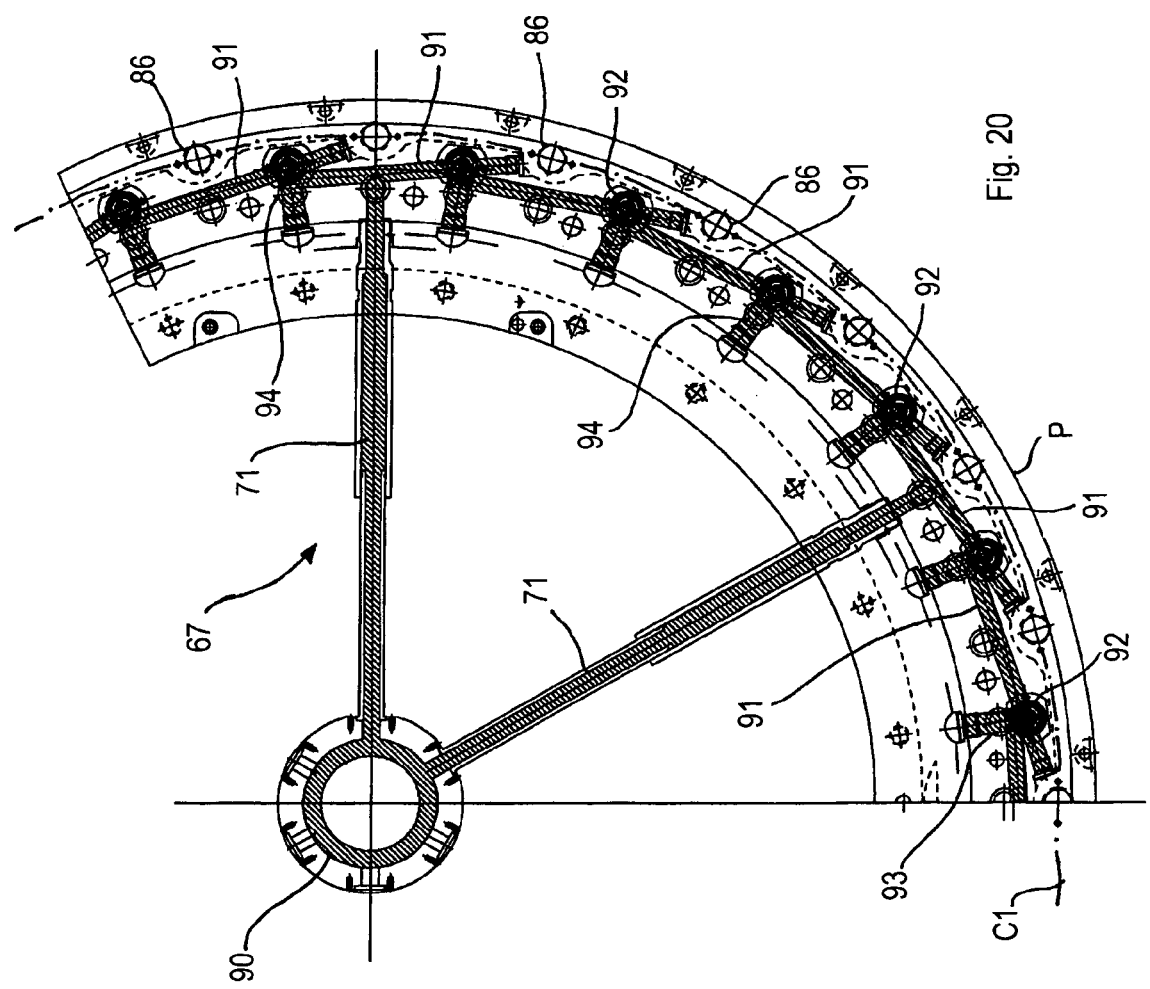

APPARATUSES FOR FORMING OBJECTS WITH UNDERCUT PORTIONS

CROSS-REFERENCE TO RELATED APPLICATIONS

This application is the U.S. national phase of International Application No. PCT/EP2006/064921, filed 1 Aug. 2006, which designated the U.S. and claims priority to Italy Patent Application No. MO2005A000212, filed 10 Aug. 2005, the entire contents of each of which are hereby incorporated by reference.

DESCRIPTION

The invention relates to apparatuses for forming objects, in particular through compression moulding of plastics. The apparatuses according to the invention are particularly suitable for forming preforms for containers, such as bottles, made for example of polyethyleneterephthalate (PET), polypropylene (PP), polyvinylchloride (PVC), high density polyethylene (HDPE) or polyethylenenaphthalate (PEN).

WO 2005/058572 discloses an apparatus for compression moulding synthetic resin preforms by pressure-inserting a mould punch into a die cavity which is loaded with a charge. The apparatus comprises a first tubular element, which is axially fixed during the charge loading and moulding stage, and a second tubular element, which is axially movable telescopically relative to the first tubular element in order to define the die cavity. The apparatus further comprises a thrust element for pushing the second tubular element upwards.

U.S. Pat. No. 5,932,155 discloses an apparatus for making plastic articles utilizing a plurality of tools peripherally supported on a rotating turret. Each tool comprises a female mould assembly cooperating with a core. Each tool is moved by cams and includes a nitrogen cylinder that prevents catastrophic overload.

U.S. Pat. No. 4,529,372 discloses an apparatus and a method for forming hollow articles from plasticized material. A charge of plasticized material is subjected to a pressure forming step to form a preform on a core. The preform is then blow-moulded in a blow cavity by introducing blowing gas into the preform through the preform core.

WO 03/072333 discloses an apparatus for forming preforms for containers comprising a carousel rotatable around a vertical axis and peripherally provided with a plurality of moulds. Each mould comprises a first half mould and a second half mould that are movable towards and away from one another in a vertical moulding direction. The first half mould comprises a punch, associated with two movable die parts provided with shaping surfaces shaped for forming a threaded neck of the preform. The die parts are rotatable around a hinge axis arranged parallel to the moulding direction and can move between a distanced position, in which the shaping surfaces associated with each die part are distanced from one another, and a contact position, in which the shaping surfaces are near one another.

A hollow presser keeps the die parts in contact with one another in the contact position and is slidable inside a cylindrical chamber containing a substantially invariable quantity of pressurised gas.

The latter pushes the hollow presser to the outside of the cylindrical chamber in contact with the die parts. The cylindrical chamber is obtained on a movable slide in the moulding direction.

The die parts and the punch are reciprocally movable in the moulding direction.

The second half mould comprises a die cavity shaped for shaping an external substantially cylindrical surface of the preform.

A supplying device is furthermore provided that introduces inside the die cavity a dose of plastics to be shaped.

During operation, initially, the first half mould and the second half mould are distant from one another by a quantity that is such as to enable the supplying device to deposit a dose of plastics to be shaped inside the die cavity.

A driving device arranges the two movable die parts in reciprocal contact and drives the latter and the punch so as to make them approach the die cavity along the moulding direction. In an initial phase of the closing operation of the die, the two movable die parts come into contact with the die cavity and stop whilst the punch continues to approach said cavity, compressing the plastics that constitutes the dose and making it progressively occupy the entire forming chamber defined between the punch, the die cavity and the movable die parts.

The slide in which the cylindrical chamber is obtained moves together with the punch, approaching the die cavity, whilst the hollow presser remains in a fixed position with respect to the die cavity, exerting a clamping force on the two movable die parts. The gas contained in the cylindrical chamber is progressively pressurised, inasmuch as the volume available to it decreases. As a result, the clamping force that keeps the two movable die parts together progressively increases depending on the position of the hollow presser inside the cylindrical chamber.

A drawback of the apparatus disclosed in WO 03/072333 is that it is not possible to apply optimal clamping force to the two movable die parts. In fact, if in the cylindrical chamber a gas is present having pressure that is too low, the force exerted on the hollow presser when the movable die parts shape the neck of the preform may not be sufficient to counteract the thrust exerted by the plastics. On the other hand, if in the cylindrical chamber a gas is present having a pressure that is too high, clamping forces are generated that are greater than what is required in the phase in which the movable die parts, although already closed, have not yet been reached by the plastics. This causes excessive stress to the components of the apparatus, particularly at the moment in which the movable die parts come into contact with the die cavity with a blow that can be rather violent.

A further drawback of the apparatus disclosed in WO 03/072333 is that the movable die parts, in order to disengage from undercut portions of the preform that has just been shaped, require ample manoeuvring space. In fact, the neck of each preform is normally provided with an external thread that is not symmetrical with respect to a longitudinal axis of the preform. When the movable die parts rotate around the hinge axis, an end zone of a die part that has formed a certain thread can interact with adjacent portions of the thread and possibly damage them. In order to try to overcome this drawback the distance between the shaping surface of each die part and the respective hinge axis is increased, so that the shaping surface moves along a circumference arch having a relatively great radius. This causes an increase in the overall dimensions of the apparatus.

The necks of the preforms are usually provided with a plurality of grooves that are substantially parallel to the longitudinal axis of the preform. These grooves enable any gas contained in the bottle obtained from the preform to leave the bottle progressively whilst the consumer removes the cap thereof.

The aforementioned grooves are delimited, parallel to the longitudinal axis of the preform, by sides that are tilted according to a preset angle. If the movable die parts move away from one another by rotating around a vertical hinge axis, it may happen, in particular with certain arrangements of the grooves and of the tilt of the sides that delimit them, that when the movable die parts move from the contact position to the distanced position they interfere with the sides of the grooves. In other words, the sides of the grooves may, for preforms having necks of certain geometries, constitute undercut portions that it is not possible to extract from the moulds disclosed in WO 03/072333 without the movable die parts interfering with the corresponding neck.

A still further drawback of the known apparatuses is that they do not enable precise positioning of the movable die parts in relation to the die cavity and to the hollow presser to be obtained. In fact, owing to processing errors or assembly defects in the movable die parts or in a cam that drives them between the distanced position and the contact position, the movable die parts, which should meet along a theoretical contact plane, may touch in a different position from the one envisaged. If this occurs, the movable die parts may be misaligned with respect to a seat obtained in the die cavity and/or to a further seat obtained in the hollow presser with which they are intended to engage through shapingly coupling. Imprecisions in the moulding operations and undesired blows are thus generated or even the closing of the mould may be prevented.

Apparatuses are known for forming caps through compression moulding, comprising a moulding carousel on which there is mounted a plurality of moulds. Each mould comprises a die that is movable with respect to a corresponding punch in a moulding direction, between an open position in which a dose of plastics is introduced into the die and a closing position in which the dose is shaped so as to obtain the cap.

In the known apparatuses for producing caps, the dies are moved by respective actuators connected to a single hydraulic circuit provided with valves that regulate the moulding operations. When a die receives a dose, the hydraulic circuit sends a driving fluid to the corresponding actuator so as to move the die to the punch. Only when the die is in the closed position, the hydraulic circuit can be used to drive a subsequent die that has just received a new dose.

In order to increase productivity in the apparatuses disclosed above, the hydraulic circuit is run in extreme conditions, so as to reduce as far as possible the time required to close or open the moulds. Nevertheless, peaks and jumps of pressure are recorded in the driving fluid operating in the hydraulic circuit that generate a rapid deterioration of the components and can seriously damage the apparatus.

An object of the invention is to improve the apparatuses for forming objects, particularly preforms for containers.

Another object of the invention is to provide an apparatus for forming objects having undercut portions by using a die arrangement comprising at least two movable parts, in which the movable parts are kept in contact with one another with an optimal clamping force.

A still further object of the invention is to obtain an apparatus provided with a die arrangement comprising at least two movable parts that require reduced manoeuvring space to completely disengage from undercut portions of the formed objects without damaging them.

A still further object of the invention is to obtain an apparatus provided with a device for positioning in a precise and repeatable manner said at least two movable parts.

A still further object of the invention is to provide an apparatus provided with a mould arrangement drivable by a drive circuit arrangement that enables the closing and opening operations of the mould arrangement to be optimised.

In a first aspect of the invention, there is provided an apparatus for forming an object from a dose of plastics, comprising a die arrangement provided with a cavity for receiving said dose and with at least two parts reciprocally movable for shaping an undercut portion of said object, at least one fluid for applying a clamping force so as to keep said at least two parts in contact, wherein said at least one fluid is such as to increase discontinuously said clamping force from an initial force that is applicable when said dose is substantially contained in said cavity to a final force that is applicable when said at least two parts shape said undercut portion.

Owing to this aspect of the invention, it is possible to obtain an apparatus in which to the at least two movable parts an optimal clamping force is applied in subsequent forming phases. In fact, the at least one fluid exerts a relatively low initial force whilst the plastics, initially received in the cavity, flows to the at least two movable parts without yet having reached them. A final force that is significantly greater than the initial force is on the other hand exerted when the plastics, having reached the at least two movable parts, tends to distance them from one another.

The at least one fluid acts on the at least two movable parts with very reduced overall dimensions and maintains high long-term operating efficiency, thus reducing maintenance costs.

In a second aspect of the invention, there is provided an apparatus for compression-moulding an object from a dose of plastics, comprising a die arrangement provided with a cavity for receiving said dose and with at least two parts suitable for shaping an undercut portion of said object, wherein said at least two parts are movable with respect to one another along a substantially rectilinear trajectory.

Owing to this aspect of the invention, it is possible to obtain an apparatus in which the aforementioned at least two parts can disengage completely from the formed objects in very reduced manoeuvring spaces without damaging undercut portions of these objects.

In a third aspect of the invention, there is provided an apparatus for forming an object, comprising a die arrangement having a first part and a second part that are reciprocally movable so as to shape an undercut portion of said object in a contact position, wherein it comprises a positioning arrangement for positioning said first part in said contact position and a pressing element for pushing said second part against said first part in said contact position.

Owing to this aspect of the invention, it is possible to obtain an apparatus that enables the first part and the second part of the die arrangement to be arranged in a precise and repeatable manner. In fact, the pressing element only pushes the second part against the first part in the contact position, without modifying the contact position, determined unequivocally by the positioning arrangement.

This enables the positioning errors of the first part and of the second part of the die arrangement to be reduced considerably that may cause undesired blows to the moulds and imperfections in the formed objects.

In a fourth aspect of the invention, there is provided an apparatus for forming objects comprising a plurality of moulds that are openable and closable by means of a hydraulic device, wherein said hydraulic device comprises a hydraulic circuit arrangement arranged for driving a fraction of said plurality of moulds and a further hydraulic circuit arrangement distinct from said hydraulic circuit arrangement and arranged for driving a further fraction of said plurality of moulds.

Owing to this aspect of the invention, it is possible to obtain an apparatus provided with a hydraulic device that enables the opening and closing times of the moulds to be optimised. In this way it is possible to obtain high productivity without it being necessary to have to subject the components of the hydraulic device to extreme operating conditions. For example, if the hydraulic circuit arrangement comprises a first hydraulic circuit and the further hydraulic circuit arrangement comprises a second hydraulic circuit, the first hydraulic circuit and the second hydraulic circuit being distinct from one another and each arranged for driving a respective fraction of the aforementioned plurality of moulds, it is possible to double the operating time that each mould requires in order to be able to complete a particular operation during moulding. For example, a first mould, after receiving a dose of plastics to be shaped, has time within which to complete closure that is double the traditional case in which only one hydraulic circuit is provided. In fact, it is not necessary to complete closure of the first mould in order to enable a second mould adjacent thereto to be able to be driven, inasmuch as the latter is connected to the second hydraulic circuit and is independent of the first mould. Closing of the first mould has to be completed to enable driving of a third mould, adjacent to the second mould and connected operationally to the first hydraulic circuit. It is possible to provide a number of hydraulic circuits equal to the number of moulds so that each of the latter can be driven in a manner that is completely autonomous and independent of the other moulds.

The invention can be better understood and implemented with reference to the attached drawings that illustrate some embodiments thereof by way of non-limitative example, in which:

FIG. 1 is a fragmentary and partially sectioned view of a portion of an apparatus for forming objects in a first operating configuration;

FIG. 13 is a partially sectioned side view, showing supporting arms for supporting the movable die parts of FIG. 9;

FIG. 14 is a plan view of the supporting arms of FIG. 13;

FIG. 15 is a section taken along the plane XV-XV in FIG. 13;

FIG. 20 is a partially sectioned schematic plan view, showing the further hydraulic circuit arrangement in FIG. 19.

Figure 2:
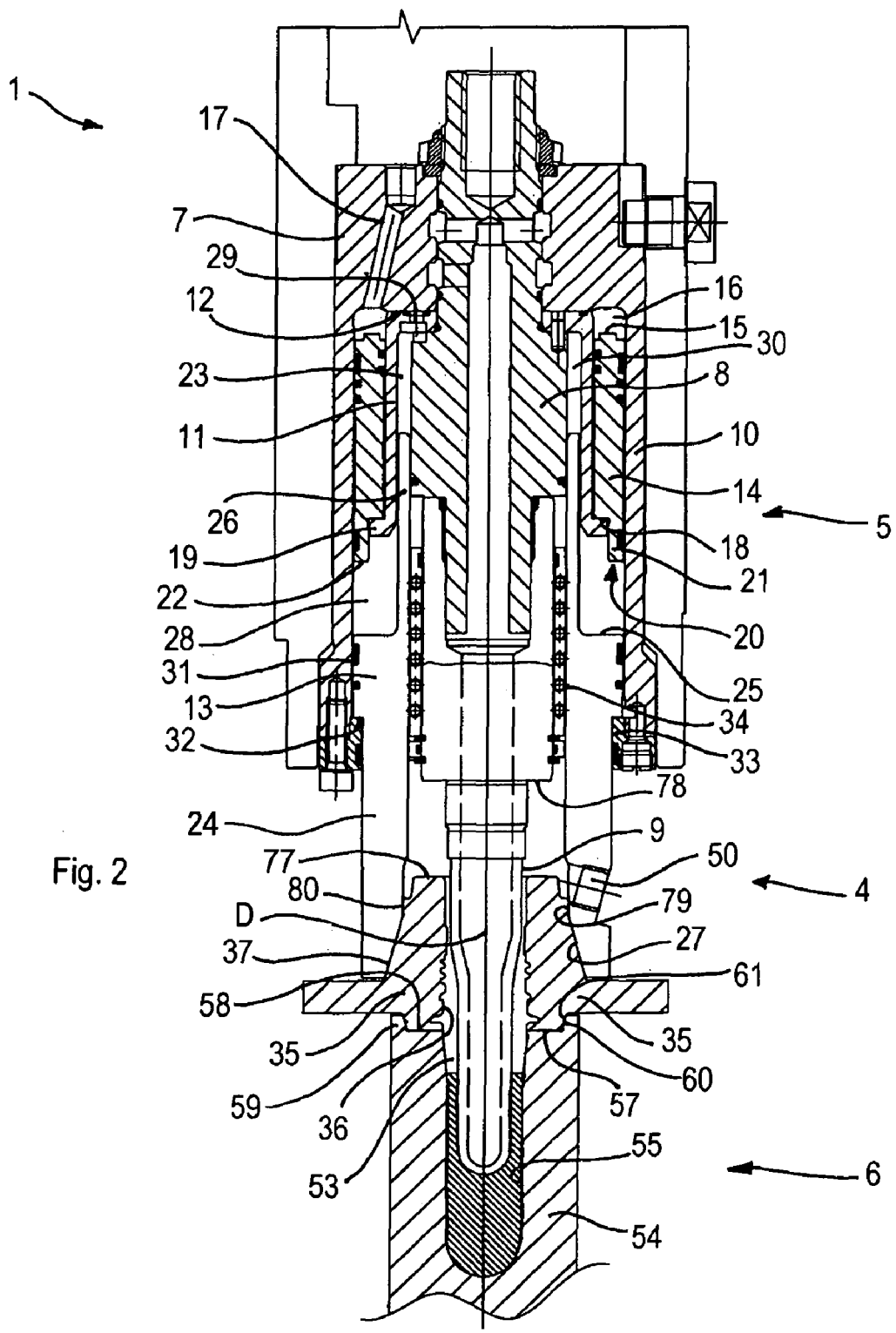
FIG. 2 is a view of the apparatus in FIG. 1 in a second operating configuration.

With reference to FIGS. 1 to 8, there is shown an apparatus 1 for forming objects, in particular preforms 2, from doses 3 of plastics.

The apparatus comprises a plurality of moulds 4 supported peripherally on a moulding carousel rotatable around a rotation axis. Each mould 4 comprises a first half mould 5 and a second half mould 6 that are drivable in a reciprocal approaching/moving away direction along a moulding axis D parallel to said rotation axis.

The first half mould 5 comprises a supporting element 7 provided with a cavity delimited by a wall 10. Within the aforesaid cavity a fixing body 8 is housed centrally by means of which a punch 9 is fixed to the supporting element 7.

Within the cavity of the supporting element 7 an internal transverse surface 12 is provided to which a fixed-sleeve element 11 is fixed that is coaxial to the moulding axis D. The fixed-sleeve element 11 is provided below with an abutting portion 19 that projects radially to the moulding axis D towards the wall 10. The abutting portion 19 is distant from the wall 10 by a quantity that is such as to define a passage section 20.

Between the fixed-sleeve element 11 and the wall 10 a movable sleeve element 14 is housed that is slidable along the moulding axis D. The movable sleeve element 14 comprises a first operating surface 15 above, facing the transverse surface 12 and distanced from the latter by a quantity that is variable according to the position of the movable sleeve element 14 inside the supporting element 7. In this way the first operating surface 15, an internal surface of the wall 10 and an external surface of the fixed-sleeve element 11 define an upper chamber 16 having a height, measured along the moulding axis D, which is variable according to the position of the movable sleeve element 14.

The movable sleeve element 14 is provided below with a resting surface 18 shaped to rest on the abutting portion 19 of the fixed-sleeve element 11. From the resting surface 18 an appendage 21 of cylindrical shape provided with a second operating surface 22 that is transverse to the moulding axis D projects towards the second half mould 6. The appendage 21 is able to traverse the passage section 20 so as to arrange the second operating surface 22 at a lower height than the abutting portion 19.

The upper chamber 16 is supplied, by means of a conduit 17, with a fluid, for example compressed air, that pushes the movable sleeve element 14 downwards so as to arrange the resting surface 18 in contact with the abutting portion 19. The aforesaid fluid can be contained in a tank that is not shown, connected to the conduit 17. If the tank has a volume that is much greater than that of the upper chamber 16, it can be stated that the fluid inside the chamber has substantially constant pressure.

Seals are arranged on side surfaces of the movable sleeve element 14 that perform a sealing action on the fluid inside the upper chamber 16.

The fixed-sleeve element 11 is arranged in relation to the fixing body 8 in such a way that a cylindrical cavity 23 shown in FIGS. 1 and 2 is defined therebetween.

The first half mould 5 further comprises a holding sleeve 13 partially housed inside the supporting element 7 and arranged in such a way as to partially surround the punch 9.

The holding sleeve 13 is slidingly movable with respect to the punch 9 parallel to the moulding axis D and comprises a coupling portion 24 on which there can be obtained a frustum conical surface 27 and a cylindrical surface 79, both facing the punch 9. The cylindrical surface 79 is arranged above the frustum conical surface 27.

The coupling portion 24 is delimited above by a contact surface 25, arranged transversely to the moulding axis D, from which a cylindrical portion 26 having a section such as to be received inside the cylindrical cavity 23 projects towards the internal transverse surface 12.

The holding sleeve 13 comprises an air suction-injection conduit 50 that is used to suck air during closing operation of the mould 4 to facilitate the forming operation and to inject air during opening operation of the mould 4, to facilitate the extraction of the newly-shaped preform 2.

Between the contact surface 25, the wall 10, the appendage 21, the abutting portion 19, and the cylindrical portion 26, there is defined a lower chamber 28, the height of which, measured parallel to the moulding axis D, is variable according to the position of the holding sleeve 13 with respect to the supporting element 7. The lower chamber 28 communicates, through a gap defined between the cylindrical portion 26 and the fixed-sleeve element 11, with a zone 30 of the cylindrical cavity 23, shown in FIGS. 1 and 2. The zone 30 is delimited by the cylindrical portion 26, by the fixed-sleeve element 11 and by the fixing body 8. A further conduit 29 supplies the zone 30, and then also the lower chamber 28, with a further fluid, for example compressed air, at a pressure that is less than the pressure provided in the upper chamber 16.

The aforementioned further fluid can be contained in a further tank that is not shown, connected to the further conduit 29. If the further tank has a volume that is much greater than that of the lower chamber 28, it can be stated that the further fluid inside the chamber has a substantially constant pressure.

If the fluid in the upper chamber 16 and the further fluid in the lower chamber 28 are compressed air, the tank and the further tank to which the conduit 17 and the further conduit 29 are connected can be connected periodically to an air-dispensing device, which can be provided on the carousel. In this way it is ensured that the pressure in the upper chamber 16 and in the lower chamber 28 does not decrease excessively because of possible leaks.

The dispensing device can withdraw relatively low-pressure compressed air, for example 6 bar, from an industrial supply line. Rotating joints are provided that are equipped with seals and that connect a removal port of the dispensing device to a distribution port of the supply line. As the pressure of the compressed air coming from the supply line is relatively low, complicated arrangements are not necessary for the seals to prevent leaks inside the rotating joint.

The dispensing device further comprises a first pressure multiplier that compresses the air, initially having pressure that is equal to the supply line pressure, until it reaches a first pressure value, for example 24 bar, with which the lower chamber 28 is supplied.

The dispensing device further comprises a second pressure multiplier that compresses the air until it reaches a second pressure value that is greater than the first pressure value and equal, for example, to 48 bar, with which the upper chamber 16 is supplied. The second pressure multiplier can be provided downstream of the first pressure multiplier so as to receive from the latter a fraction of air flow that has already undergone a first increase in pressure and which is intended to be again compressed until it reaches the second pressure value.

The holding sleeve 13 is provided on the side, in a central region thereof, with an external seal surface 31, provided with seals, delimited below by a further resting surface 32, arranged transversely to the moulding axis D and shaped to be supportingly received by an abutting element 33, fixed below the wall 10.

The further fluid in the lower chamber 28 pushes down the holding sleeve 13, in such a way that the further resting surface 32 is in contact with the abutting element 33.

Thermoregulating conduits 34 are provided arranged between the punch 9 and the holding sleeve 13, that are used to cool the mould 4 during the moulding operations.

The first half mould 5 comprises a pair of movable die parts 35 (also shown in FIGS. 9 to 12), that are used to shape a portion of the preform 2 comprising a threaded neck that is provided with undercut zones. The movable die parts 35 are drivable towards/away from one another and with respect to the moulding axis D. The movable die parts 35 at least partially surround the punch 9 and can move parallel to the moulding axis D with respect to the aforementioned punch.

Each of the movable die parts 35 comprises an internal shaping surface 36 suitable for shaping at least an external surface of the threaded neck of the preform 2. In particular, if it is desired to obtain a bottle of limited capacity from the preform, the internal shaping surface 36 shapes only the neck of the preform which comprises an external thread, an annular projection and a collar, which do not undergo substantially shape variations during the subsequent stretch-blowing process undergone by the preform.

If on the other hand it is desired to obtain a bottle with great capacity, for example 1.5 liters, the movable die parts 35 shape not only the neck but also an intermediate portion of the preform intended to form part of the containing body of the bottle.

Each movable die part 35 is delimited externally by a further frustum conical surface 37, suitable for interacting with the frustum conical surface 27 of the holding sleeve 13 and by a further cylindrical surface 80, arranged above the further frustum conical surface 37 to interact with the cylindrical surface 79 of the holding sleeve 13.

The movable die parts 35 are delimited below by a transverse coupling surface 57, transverse to the moulding axis D and shaped to interact with the second half mould 6.

The transverse coupling surface 57 is surrounded by an annular surface 60 of frustum conical shape, suitable for interacting with the second half mould 6.

The movable die parts 35 are provided above with abutting portions 77, shown in FIG. 2, that can abut on resting portions 78 of the punch 9.

As shown in FIGS. 14 and 15, a carriage 38 is provided that supports the movable die parts 35, and which can be slidingly moved by a driving bar 41 along a guiding column 40, parallel to the moulding axis D. The carriage 38 enables owing to a cam profile 49 that will be disclosed in detail below, the movable die parts 35 to be moved between a contact position P1 and a distanced position P2, shown in FIGS. 9 and 10. In the contact position P1, the movable die parts 35 are in contact together so as to shape at least the neck of the preform 2. In the distanced position P2, the movable die parts 35 have moved away from one another to free the neck of the preform 2 so that the latter can be extracted from the mould 4.

The movable die parts 35 are supported on the carriage 38 respectively by means of a first supporting arm 39a and a second supporting arm 39b, shown in FIGS. 13 to 15. The first supporting arm 39a and the second supporting arm 39b comprise respectively a first sliding portion 42a and a second sliding portion 42b that can slide along a supporting cylindrical bar 43 fixed to the carriage 38, in a direction E arranged transversely to the moulding axis D.

The cylindrical bar 43 is provided, in an intermediate portion thereof, with an abutting element comprising a cylindrical projection 45, shaped in such a way as to supportingly receive the first sliding portion 42a of the first supporting arm 39a.

A first positioning spring 46 is provided arranged around a portion of the cylindrical bar 43, so as to push the first sliding portion 42a against the cylindrical projection 45.

The first positioning spring 46 and the cylindrical projection 45 act as a positioning arrangement that enables the first supporting arm 39a, together with the movable die part 35 mounted thereupon, to be positioned in the contact position P1 in a precise and repeatable manner.

The apparatus 1 further comprises a pressing element provided with a second positioning spring 47, having lower stiffness than the first positioning spring 46. The second positioning spring 47 is arranged around a further portion of the cylindrical bar 43 opposite the portion on which the first positioning spring 46 is wound with respect to the cylindrical projection 45.

The second positioning spring 47 acts on the second sliding portion 42b so as to push the movable die part 35 mounted on the second supporting arm 39b against the movable die part 35 mounted on the first supporting arm 39a.

As the second positioning spring 47 is less stiff than the first positioning spring 46, the movable die part 35 mounted on the second supporting arm 39b is not able to significantly move the movable die part 35 mounted on the first supporting arm 39a, held in the contact position P1 by the positioning arrangement.

It should be noted that, in the contact position P1, it is possible to define a gap C between the second sliding portion 42b and the cylindrical projection 45, as shown in FIG. 15. Owing to the gap C, in the contact position P1, the cylindrical projection 45 does not influence the movable die part 35 mounted on the second supporting arm 39b. Said part is thus positioned only by the movable die part 35 mounted on the first supporting arm 39a.

This enables the movable die parts 35 to be positioned with great precision with respect to the moulding axis D in the contact position P1.

On the first sliding portion 42a and on the second sliding portion 42b rollers 44 are supported respectively that are rotatable around respective rotation axes G that are transverse to the moulding axis D. Each roller 44 is shaped to move in relation to the aforementioned cam profile 49 that is arranged in a fixed position on the moulding carousel and is shown in FIGS. 9 to 12.

Figure 11:
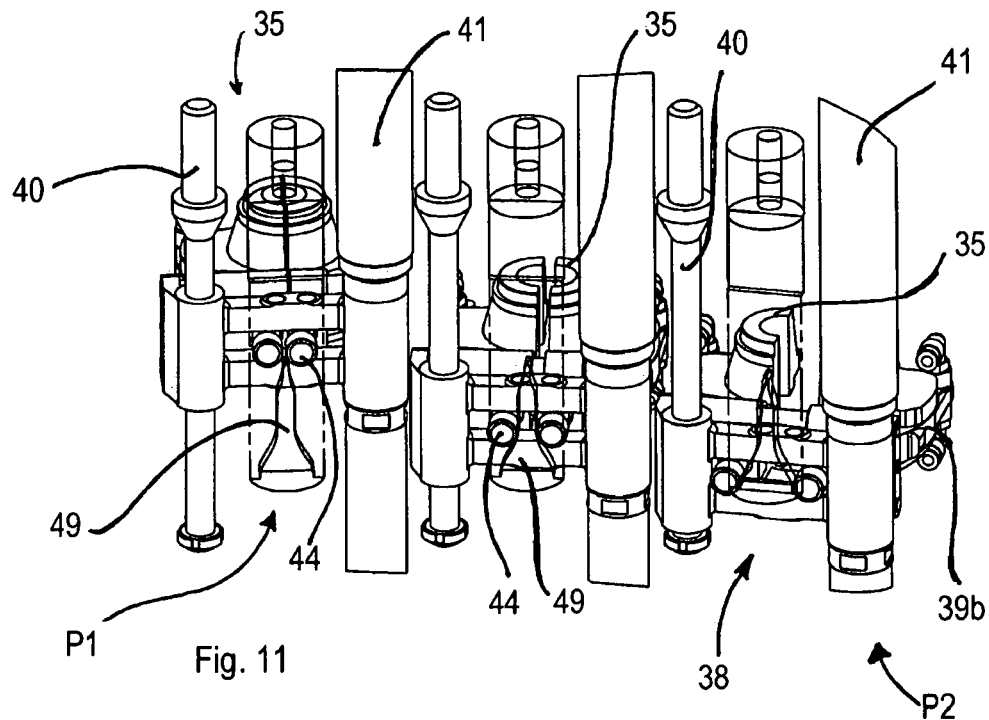
FIG. 11 is a perspective view of the rear of the portion of apparatus shown in FIG. 9.
Figure 12:
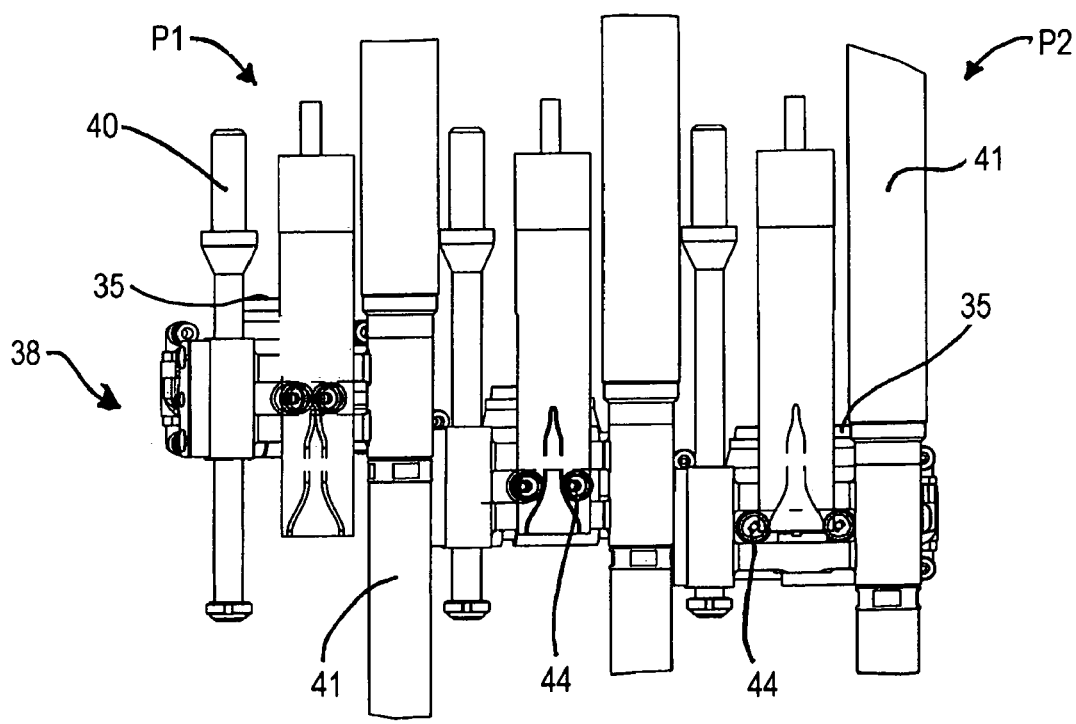
FIG. 12 is another view of the rear of the portion of apparatus shown in FIG. 9.

In the contact position P1, the rollers 44 do not interact with the cam profile 49, as shown in FIG. 11. When it is desired to extract the preform 2 from the mould 4, the carriage 38 is moved along the guiding column 40 by the driving bar 41, so that the rollers 44 start to interact with respective ramps of the cam profile 49, with which they are kept in contact respectively by the first positioning spring 46 and by the second positioning spring 47.

The rollers 44 move away from or towards one another depending on the zone of the cam profile 49 along which they travel. In particular, in the example shown, the rollers 44 move away from one another when the carriage 38 is moved down along the moulding axis D, whilst they move towards one another when the carriage 38 is moved upwards.

The first sliding portion 42a and the second sliding portion 42b, dragged by the respective rollers 44, can move away from one another or towards one another in the direction E, as shown in FIGS. 13 to 15. As a result, also the movable die parts 35 can move away from or towards one another, as shown in FIGS. 9 to 12, depending on the position of the rollers 44 with respect to the cam profile 49. It is noted that when the carriage 38 runs parallel to the moulding axis D, the movable die parts 35 mounted on the carriage 38 move with respect to one another in a rectilinear manner.

The movable die parts 35 can, in this way, be moved without changing the orientation thereof with respect to the moulding axis D.

As shown in FIGS. 1 to 8, the second half mould 6 comprises a die portion 54 provided internally with external shaping surfaces 55 that delimit a central cavity 53. The external shaping surfaces 55 are suitable for shaping externally a side wall 56 and a bottom wall 81 with which the preform 2 is provided.

The die portion 54 comprises above a further transverse coupling surface 58, intended to come into contact with the transverse coupling surface 57 of the movable die parts 35.

Figure 4:
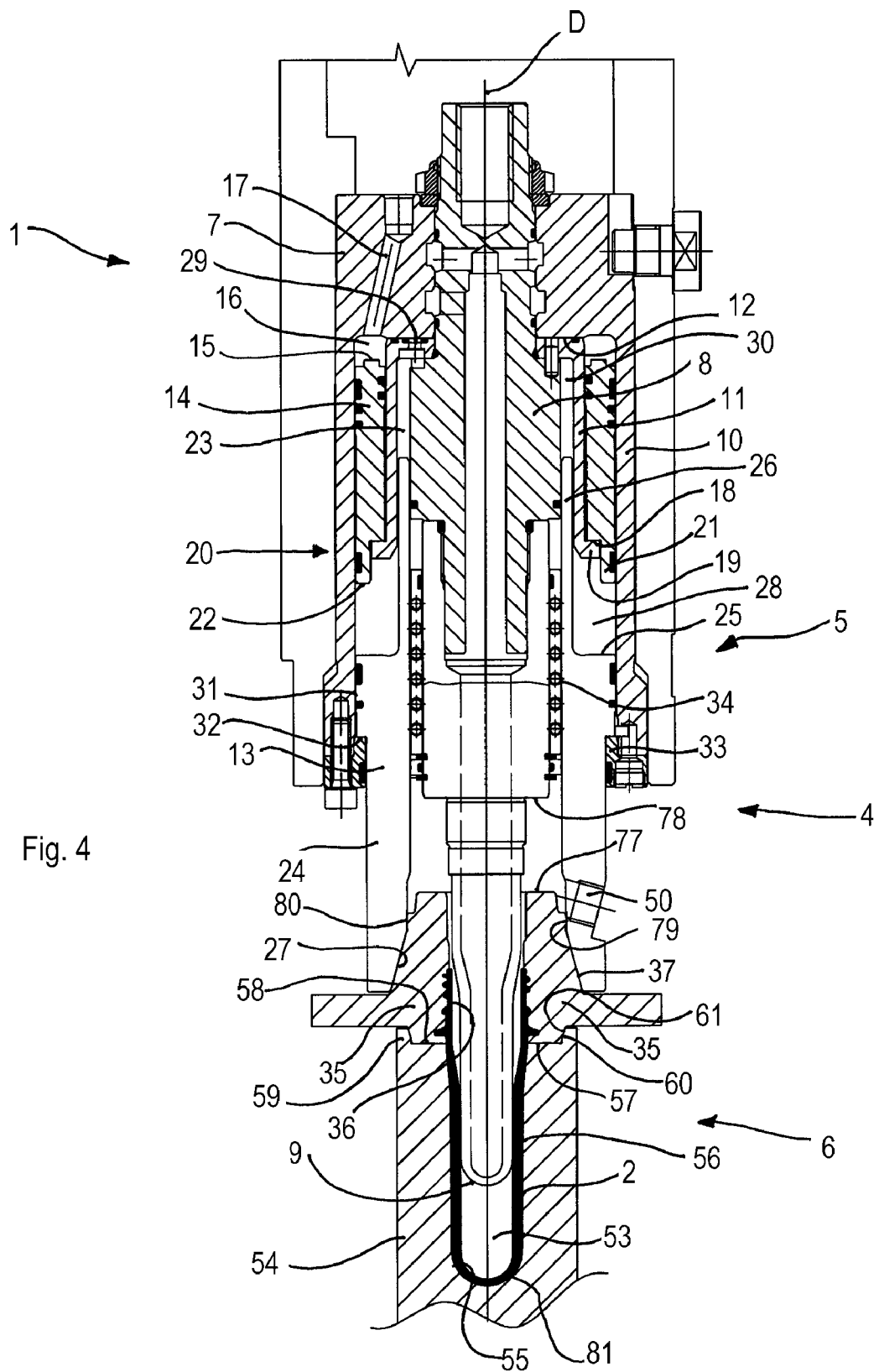
FIG. 4 is a view of the apparatus in FIG. 1 in a fourth operating configuration.

The further transverse coupling surface 58 is delimited peripherally by an annular projection 59 that projects towards the first half mould 5 and is provided internally with a further annular surface 61 having frustum conical shape, shown in FIG. 4, intended to come into contact with an annular surface 60. The further transverse coupling surface 58 and the annular surface 60 ensure precise positioning of the die parts mobile 35 with respect to the die portion 54.

During operation, the first half mould 5 and the second half mould 6 are initially far from one another to enable the dose 3 of plastics to be introduced inside the central cavity 53, as shown in FIG. 1.

The carriage 38 moves parallel to the moulding axis D the movable die parts 35 that, controlled by the cam profile 49, are arranged in the contact position P1. Subsequently, the movable die parts 35 start to interact with the holding sleeve 13. In particular, the further cylindrical surfaces 80 of the movable die parts 35 start to interact with the cylindrical surface 79 of the holding sleeve 13 before the further frustum conical surfaces 37 start to interact with the frustum conical surface 27. This enables the movable die parts 35 to be centred correctly with respect to the holding sleeve 13. Further, when the movable die parts 35 have come into complete contact with the holding sleeve 13, as shown in FIG. 1, the cylindrical surface 79 cooperates with the further cylindrical surfaces 80 and the frustum conical surface 27 cooperates with the further frustum conical surfaces 37 to keep the movable die parts 35 in the contact position P1.

In the configuration shown in FIG. 1, the holding sleeve 13 is pressed against the abutting element 33 by the further fluid contained in the lower chamber 28.

Subsequently, the second half mould 6 is advanced to the first half mould 5 along the moulding axis D. At a certain moment, shown in FIG. 2, the die portion 54 comes into contact with the movable die parts 35. The punch 9 is received inside the central cavity 53, starting to interact with dose 3, that flows to the movable die parts 35.

Whilst the second half mould 6 continues to move to the first half mould 5, the die portion 54 pushes up the movable die parts 35 that in turn lift up the holding sleeve 13, that compresses the further fluid contained in the lower chamber 28. The aforementioned further fluid keeps the holding sleeve 13 in contact with the movable die parts 35, so that the coupling portions 24 exert on the further cylindrical surfaces 80 and on the further frustum conical surfaces 37 an initial clamping force that is proportionate to the pressure of the further fluid contained in the lower chamber 28. As this pressure is less than the pressure of the fluid contained in the upper chamber 16, the initial clamping force is not particularly great. On the other hand, in these moulding phases great clamping force is not required to keep the movable die parts 35 in contact, as the latter have not yet been reached by the plastics that would tend to separate them.

Simultaneously, through the injection-suction conduit 50, air is sucked from the central cavity 53 through gaps defined between the punch 9 and the movable die parts 35. This helps the dose 3 to flow upwards and prevents the plastics from deteriorating due to the high temperatures of the air contained in the forming chamber defined between the punch 9, the movable die parts 35 and the die portion 54. The air in the aforementioned chamber in fact has become significantly overheated due to the great pressure that is generated during the forming phases.

Subsequently, as the second half mould 6 continues to approach the first half mould 5, the contact surface 25 of the holding sleeve 13 abuts on the second operating surface 22 of the movable sleeve element 14. The holding sleeve 13 thus starts to interact with the movable sleeve element 14 and pushes it to the internal transverse surface 12 of the supporting element 7, compressing the fluid contained in the upper chamber 16. Simultaneously, the plastics flow near the shaping surfaces 36 generating progressively the threaded neck of the preform 3.

Figure 3:
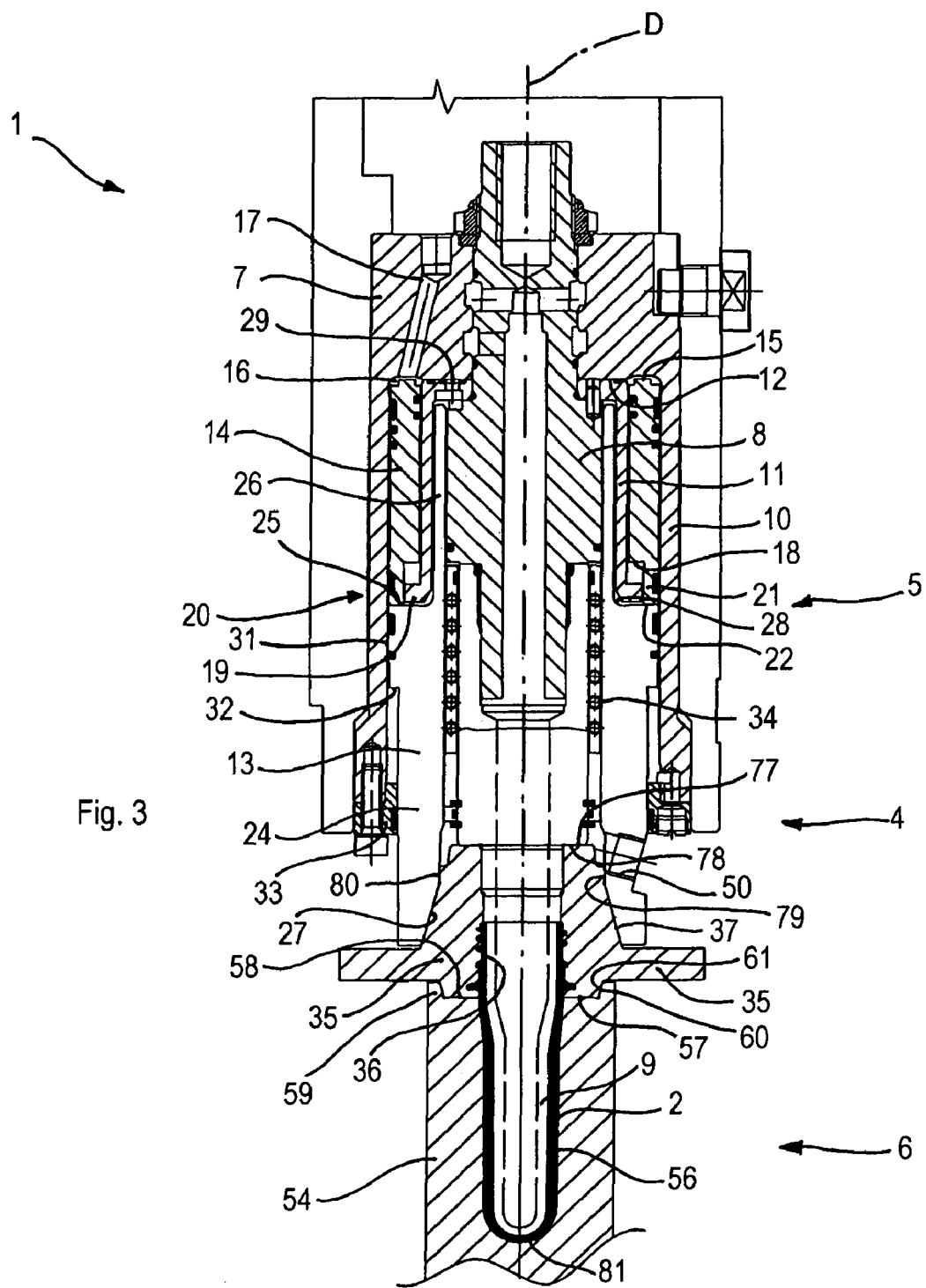
FIG. 3 is a view of the apparatus in FIG. 1 in a third operating configuration.

The movable die parts 35, and therefore also the holding sleeve 13, end the upward stroke when the abutting portions 77 meet the resting portions 78, as shown in FIG. 3. The plastics constituting the dose 3 completely fill the forming chamber defined between the punch 9, the movable die parts 35 and the die portion 54.

During this phase, the holding sleeve 13 keeps the movable die parts 35 in the contact position P1 with a final clamping force depending on the pressure of the fluid in the upper chamber 16. More precisely, the fluid contained in the upper chamber 16 exerts on the movable sleeve element 14 a first force that is proportional to the pressure in the upper chamber 16. The aforementioned first force, which is substantially parallel to the moulding axis D and is directed to the movable die parts 35, is not transmitted completely by the movable sleeve element 14 to the holding sleeve 13. In fact, on the movable sleeve element 14 a second force also acts that is parallel to the moulding axis D and directed to the supporting element 7, which is proportional to the pressure in the lower chamber 28. As the first force and the second force have directions that are opposite to one another, the movable sleeve element 14 transmits to the holding sleeve 13 a third force obtained by removing the second force from the first force. The holding sleeve 13 in turn exerts on the movable die parts 35 a clamping force that is proportional to said third force.

As the pressure in the upper chamber 16 is noticeably greater than that present in the lower chamber 28, the second force tending to push the movable sleeve element 14 to the supporting element 7 is significantly less than the first force with which the movable sleeve element 14 is pushed towards the holding sleeve 13. In this way a third force is obtained and thus a final clamping force proportional thereto that is noticeably higher than the initial clamping force, depending on the pressure in the lower chamber 28. This enables the movable die parts 35 to be kept in the contact position P1 even when, as shown in FIG. 3, the plastics has filled the space defined between the punch 9 and the movable die parts 35 and exerts a thrust on the parts that tends to move them away from one another.

It is noted that the clamping force with which the holding sleeve 13 keeps the movable die parts 35 in reciprocal contact is initially rather low, being proportional to the pressure in the lower chamber 28. When the holding sleeve 13 starts to interact with the movable sleeve element 14, the clamping force increases discontinuously, i.e. in a almost instantaneous manner inasmuch as the fluid is compressed, having relatively high pressure, contained in the upper chamber 16. The stroke of the components that constitute the mould 4, and in particular the holding sleeve 13 and the movable sleeve element 14, is dimensioned in such a way that the fluid contained in the upper chamber 16 starts to be compressed when the plastics has arrived near the movable die parts 35. In this way, the clamping force increases only when it is actually necessary, i.e. when the plastics tend to separate the movable die parts 35.

After the preform 2 has remained inside the mould 4 for a sufficient time for the shape thereof to stabilise and the plastics that constitutes it to cool sufficiently, through the injection-suction conduit 50, air is injected inside the second half mould 6, so as to promote the detachment of the punch 9 from the preform 2.

The second half mould 6 is then moved away from the first half mould 5. The punch 9 is partially disengaged from the preform 2 that has just been shaped whilst the movable die parts 35 remain joined together through the holding sleeve 13, and retain the preform 2 by means of the undercuts obtained on the threaded neck, as shown in FIG. 4.

Figure 5:
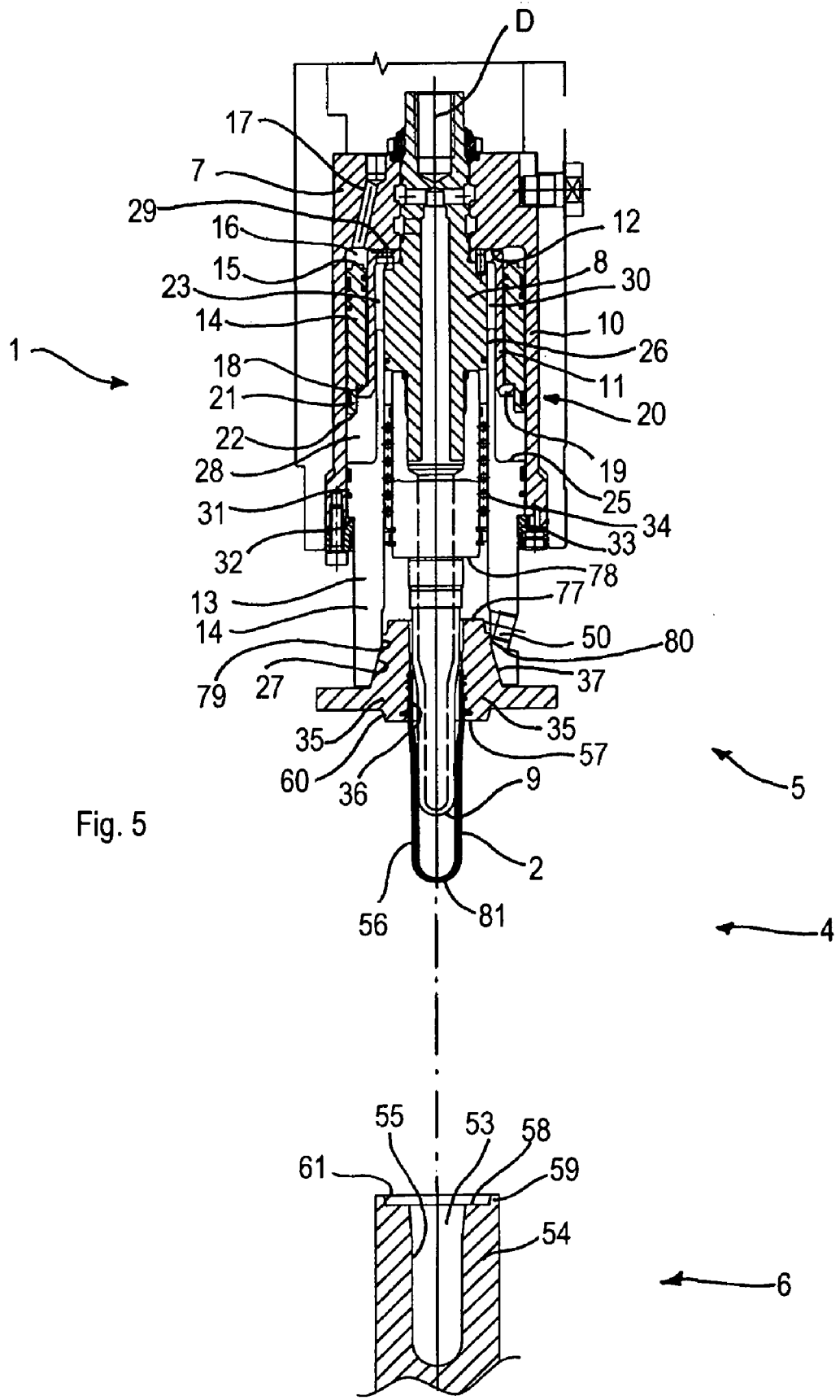
FIG. 5 is a view of the apparatus in FIG. 1 in a fifth operating configuration.

Whilst the second half mould 6 disengages from the first half mould 5, the movable die parts 35, together with the holding sleeve 13, are moved away from the supporting element 7 through the effect of the pressure of the fluids contained respectively in the upper chamber 16 and in the lower chamber 28, until the position shown in FIG. 5 is reached. In this position, the resting surface 18 of the movable sleeve element 14 is in contact with the abutting portion 19 of the fixed-sleeve element 11, whilst the further resting surface 32 of the holding sleeve 13 is in contact with the abutting element 33. The volume of the upper chamber 16 and of the lower chamber 28 is thus optimal.

Figure 6:
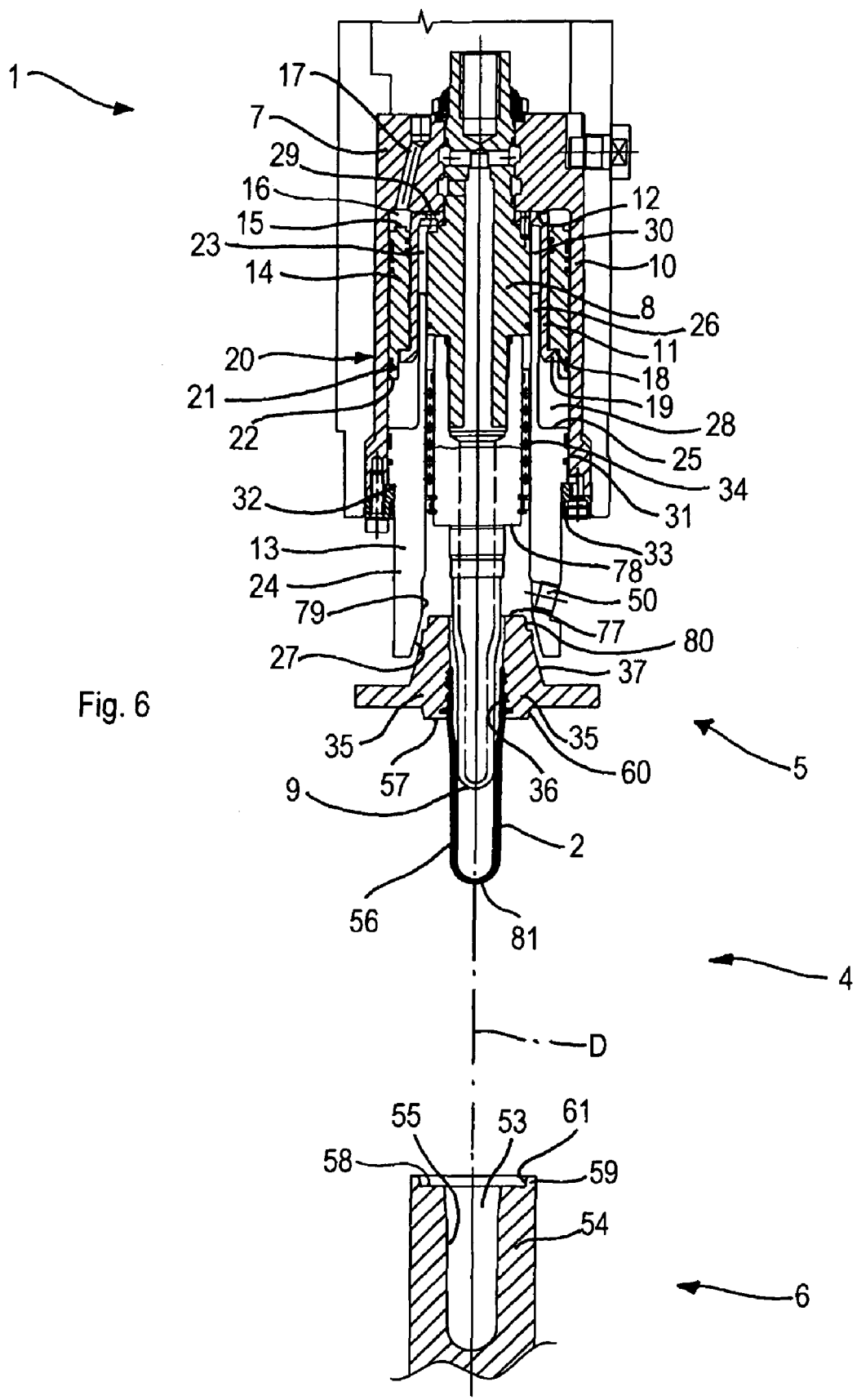
FIG. 6 is a view of the apparatus in FIG. 1 in a sixth operating configuration.
Figure 7:
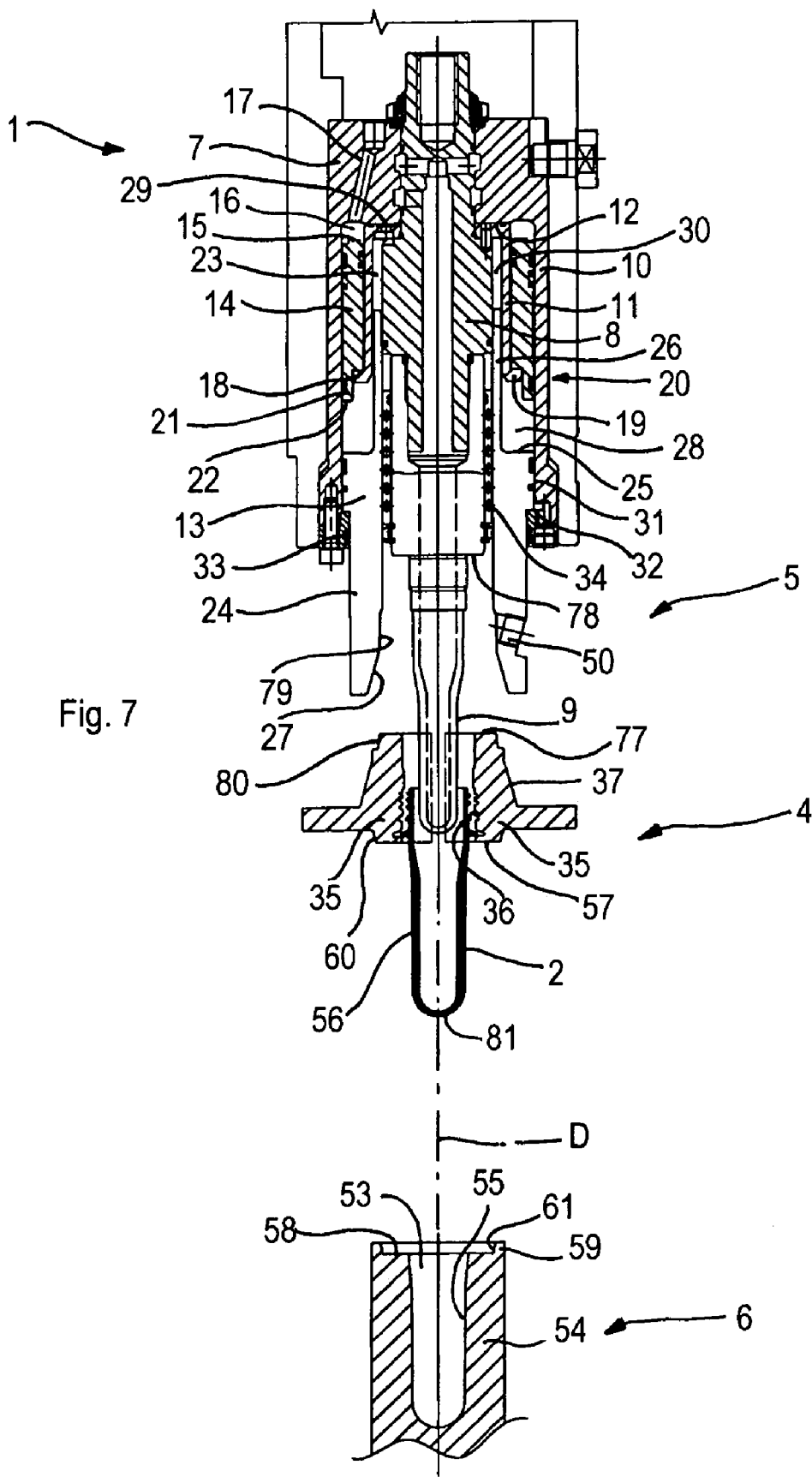
FIG. 7 is a view of the apparatus in FIG. 1 in a seventh operating configuration.

Subsequently, the movable die parts 35 are moved downwards by the carriage 38, so as to disengage from the holding sleeve 13, as shown in FIGS. 6 and 7.

Figure 8:
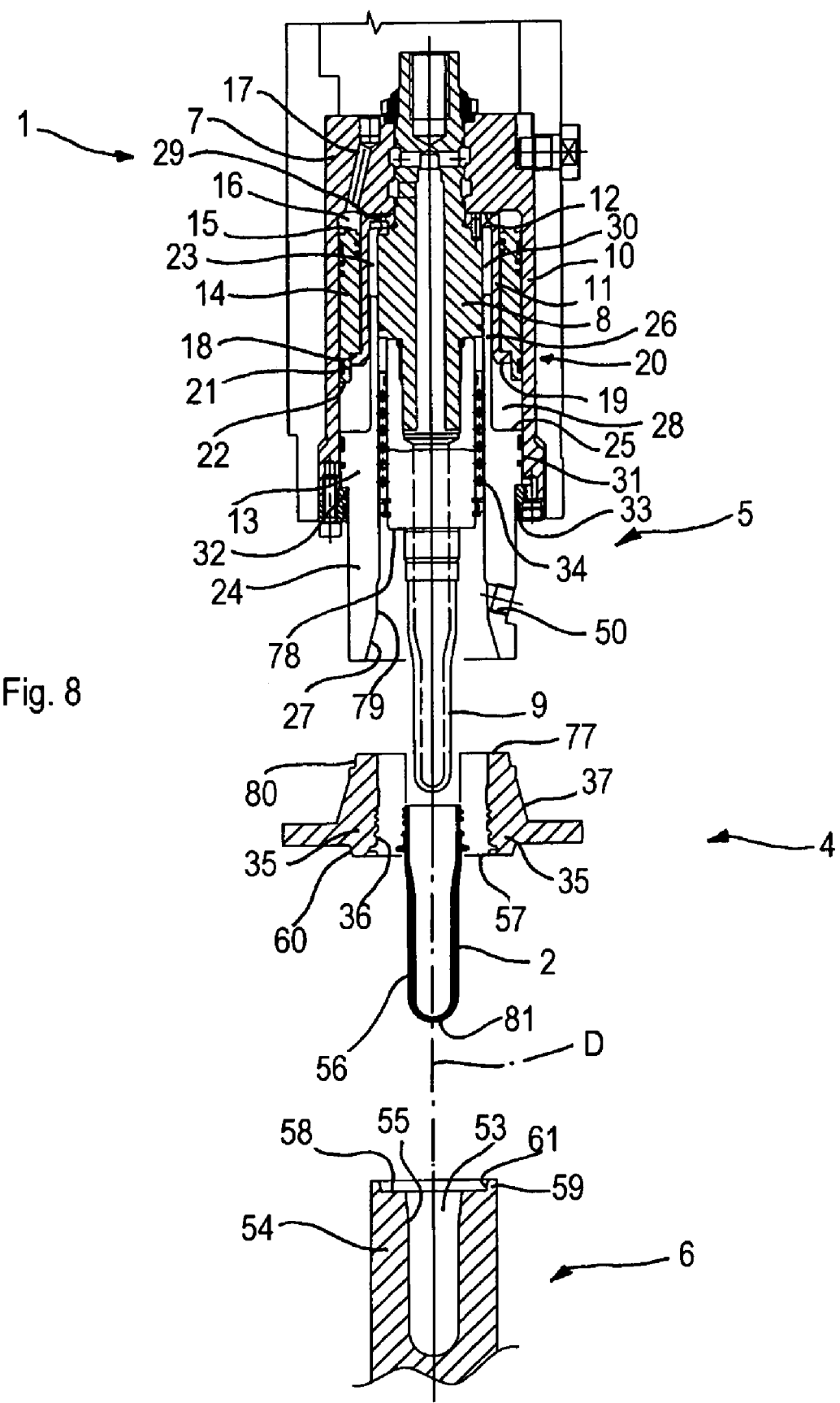
FIG. 8 is a view of the apparatus in FIG. 1 in an eighth operating configuration.
Figure 9:
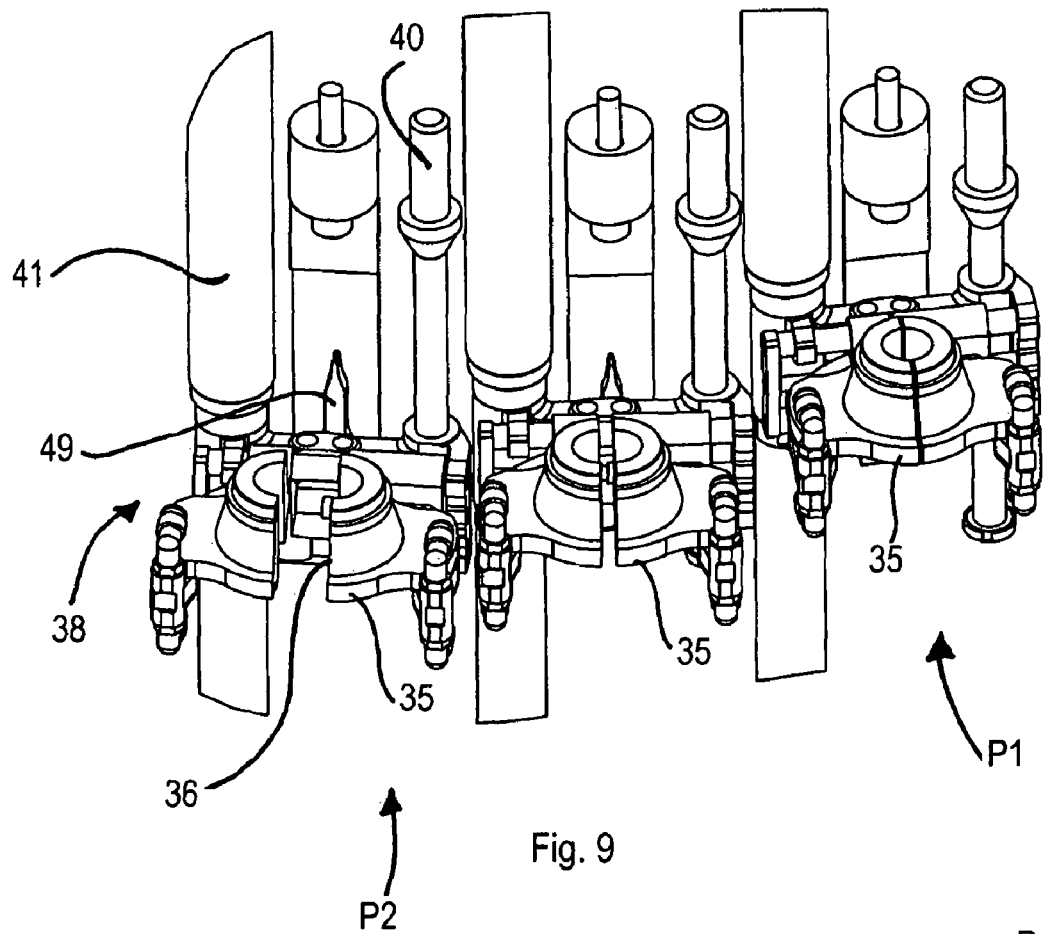
FIG. 9 is a perspective view showing a portion of the apparatus in FIG. 1 comprising some movable die parts.
Figure 10:
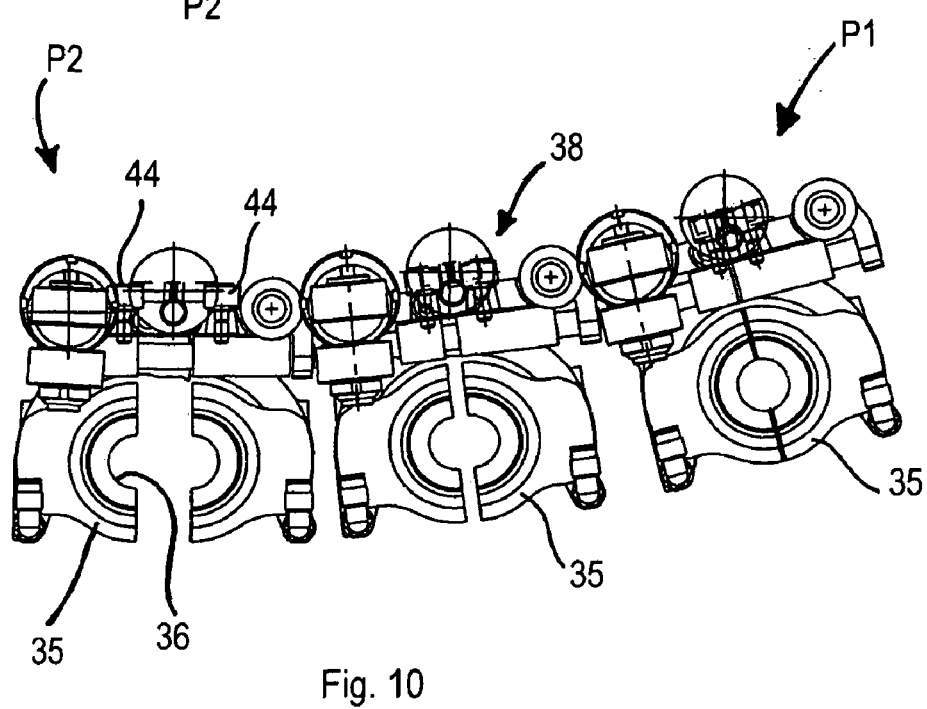
FIG. 10 is a view from above of the portion of apparatus shown in FIG. 9.

The cam profile 49 thus moves the movable die parts 35 away from one another so that the latter parts separate from the threaded neck of the preform 2, without generating impediments connected with the undercuts of the latter. At this point, as shown in FIG. 8, the preform 2 can be extracted from the mould 4 and conveyed to a subsequent processing station.

In an embodiment that is not shown, instead of the upper chamber 16 and of the lower chamber 28 a single chamber can be provided, in which a fluid is conveyed having a relatively low initial pressure, so as to apply on the movable die parts 35 an initial clamping force that is not particularly great. When the plastics starts to interact with the movable die parts 35, the pressure of the fluid sent to the aforementioned single chamber is suddenly increased by a significant quantity. This enables the clamping force to be increased in such a manner as to keep the movable die parts 35 closed even when the plastics would tend to separate them.

In a further embodiment that is not shown, more than two chambers can be provided containing respective fluids having progressively growing pressure values. This enables the clamping force to be well calibrated during closing the mould.

Figure 16:
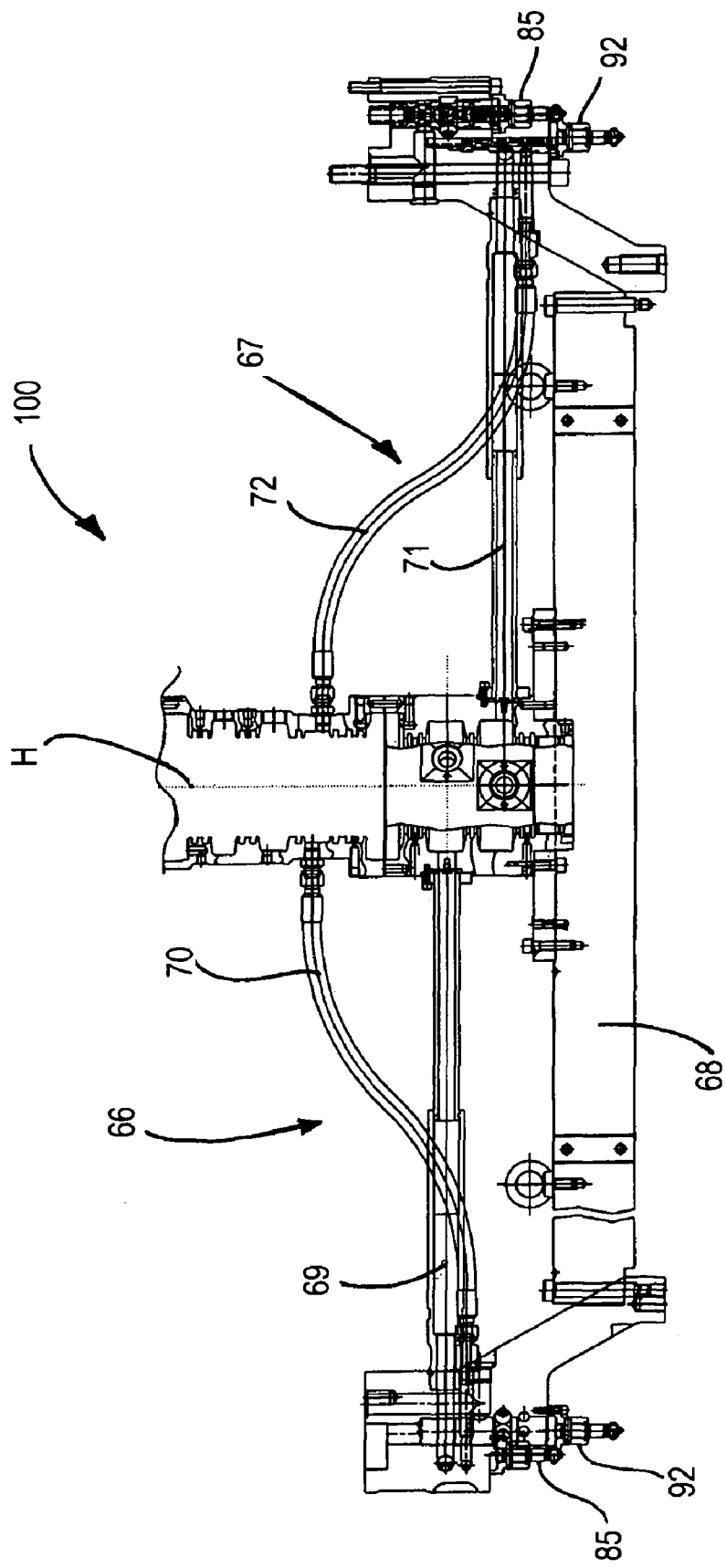
FIG. 16 is a fragmentary and partially sectioned view of an apparatus for forming objects provided with a hydraulic circuit arrangement and with a further hydraulic circuit arrangement.

With reference to FIG. 16, there is shown an apparatus 100, comprising a carousel 68 that is rotatable around a rotation axis H, and that is provided, in a peripheral region thereof, with a plurality of moulds that are not shown, for example of the type disclosed previously with reference to FIGS. 1 to 15.

Each mould is movable between an open position, of the type shown in FIG. 1, in which a dose of plastics can be inserted inside the mould, and a closing position, of the type shown in FIG. 3, in which the dose is shaped so as to obtain a desired object, for example a preform for bottles. To take the mould from the open position to the closed position or vice versa, it is possible to drive a mould component with respect to a further mould component that remains fixed. For example, if the mould is of the type shown in FIGS. 1 to 8, the second half mould 6 is moved with respect to the punch 9 by means of a hydraulic device that will be disclosed below.

The aforementioned hydraulic device comprises a first hydraulic circuit 66 that drives a first fraction, particularly a first half, of the plurality of moulds mounted on the carousel 68, and a second hydraulic circuit 67 that drives a second fraction, particularly a second half, of the aforementioned plurality of moulds.

The first hydraulic circuit 66 and the second hydraulic circuit 67 are connected to the moulds mounted on the carousel 68 in an alternate manner, i.e. the first hydraulic circuit 66 drives a plurality of first moulds each of which is interposed between two second moulds of a plurality of second moulds associated with the second hydraulic circuit 67, and vice versa.

Figure 17:
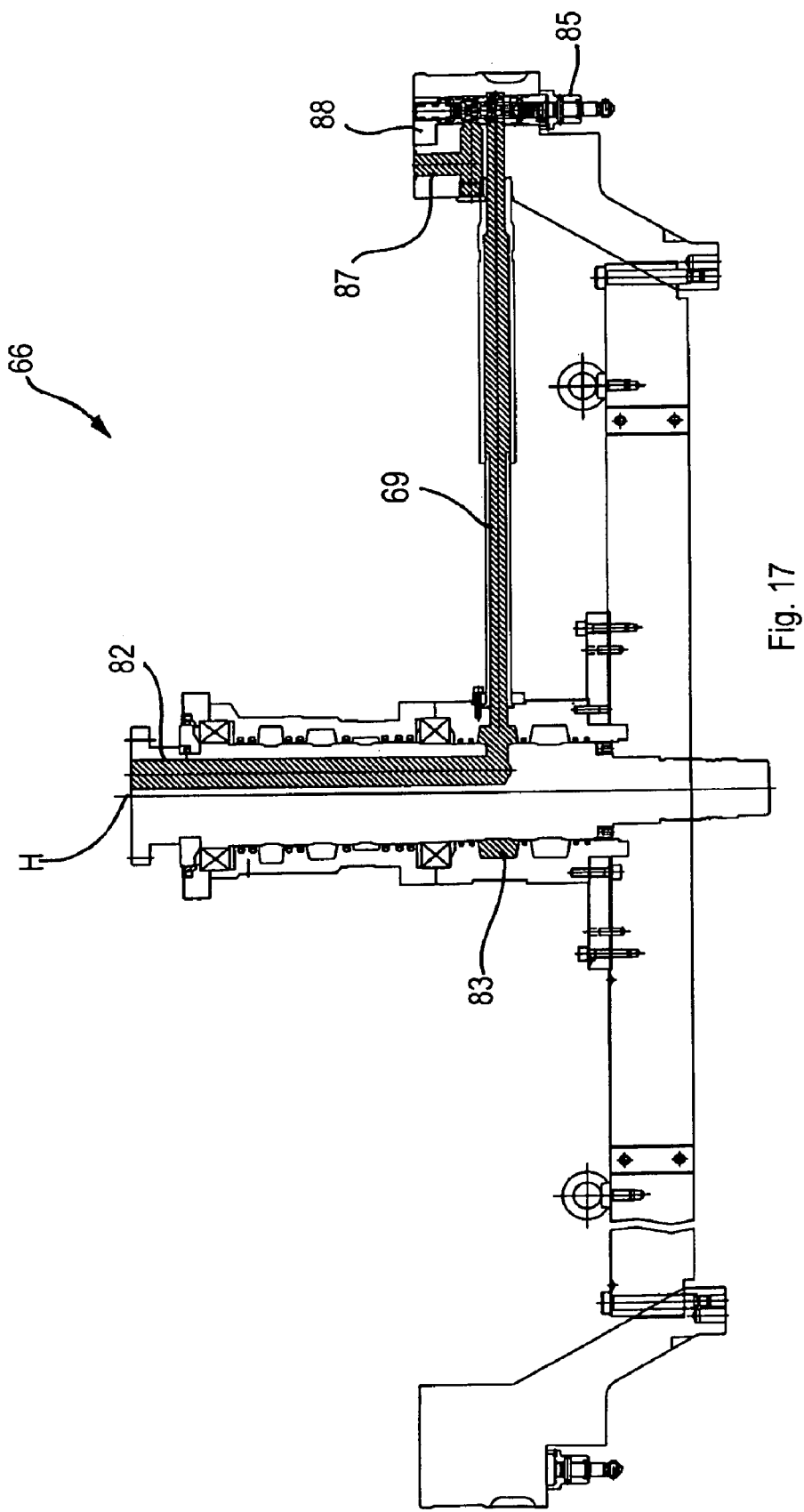
FIG. 17 is a partially sectioned schematic view that shows the hydraulic circuit arrangement in FIG. 16.
Figure 18:
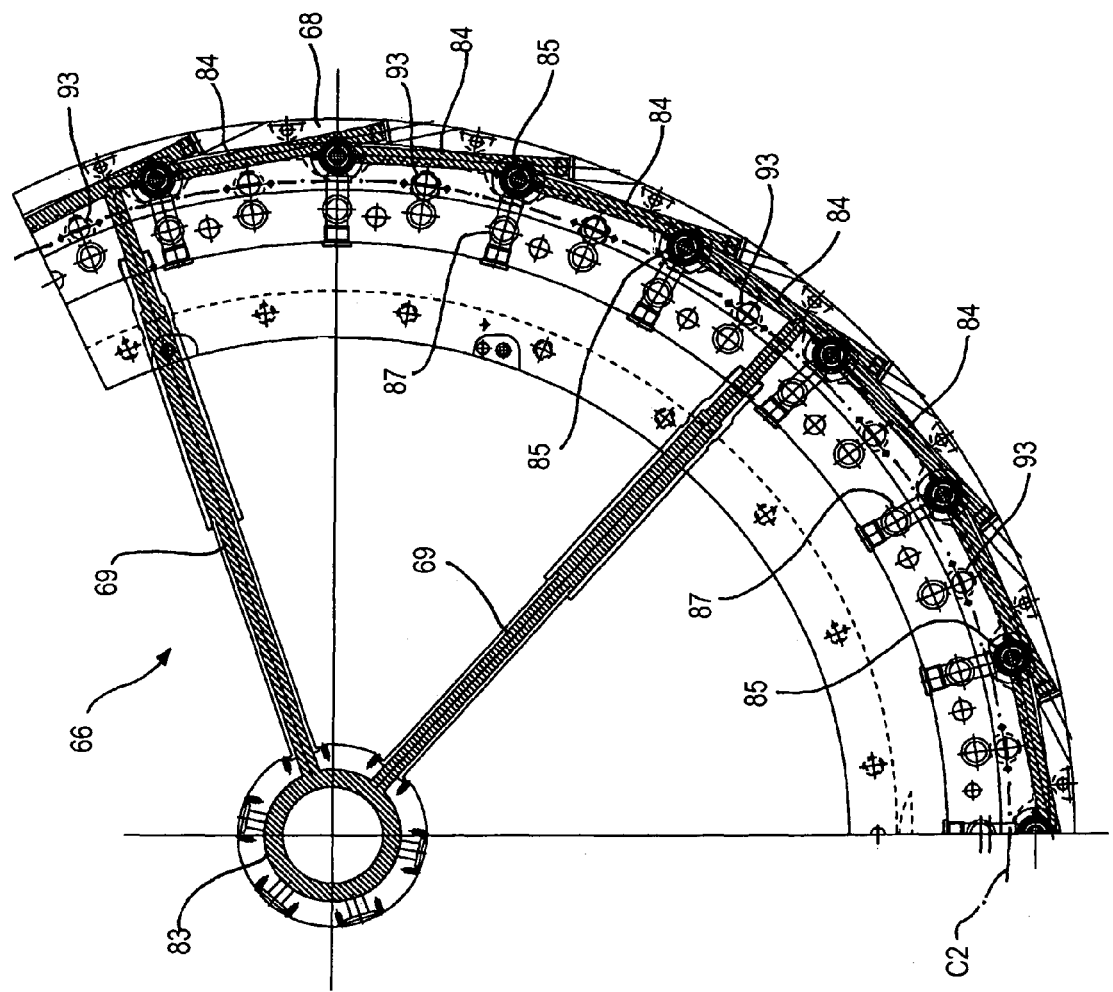
FIG. 18 is a partially sectioned schematic plan view showing the hydraulic circuit arrangement in FIG. 17.

As shown in FIGS. 17 and 18, the first hydraulic circuit 66 is provided with a first pump that is not shown that sends a first pressurised driving fluid, for example oil, in a first inlet conduit 82 arranged parallel to the rotation axis H. The first inlet conduit 82 leads into a first annular conduit 83, extending around the rotation axis H, from which a plurality of first distributing conduits 69 leads away. The latter are arranged radially with respect to the first annular conduit 83 and are angularly equidistant around the rotation axis H.

Each first distributing conduit 69 is in fluid communication with a plurality of first supply conduits 84, obtained in a peripheral region of the carousel 68 and arranged transversely to the first distributing conduits 69. Each first supply conduit 84 is associated with a first valve 85 that enables the first driving fluid to be introduced to a corresponding first actuator that is not shown that is associated with a first mould of the first fraction of moulds.

Each first valve 85 is mounted in a first seat 86, obtained on the carousel 68 and more visible in FIG. 20. The first seats 86 are positioned along a first circumference C1, centred on the rotation axis H and arranged near the external perimeter P the carousel 68. The first seats 86 are angularly distanced at an equal distance along the first circumference C1.

With each first valve 85 a first connecting conduit 87 is further associated by means of which the first driving fluid coming from the first valve 85 can be sent to the corresponding first actuator. The first valve 85 is adjacent to a first discharge channel 88 for discharging the first driving fluid when the corresponding first mould is opened.

The first hydraulic circuit 66 further comprises first return conduit arrangement 70, shown in FIG. 16, that takes the first driving fluid from the first discharge channel 88 to the first pump.

Figure 19:
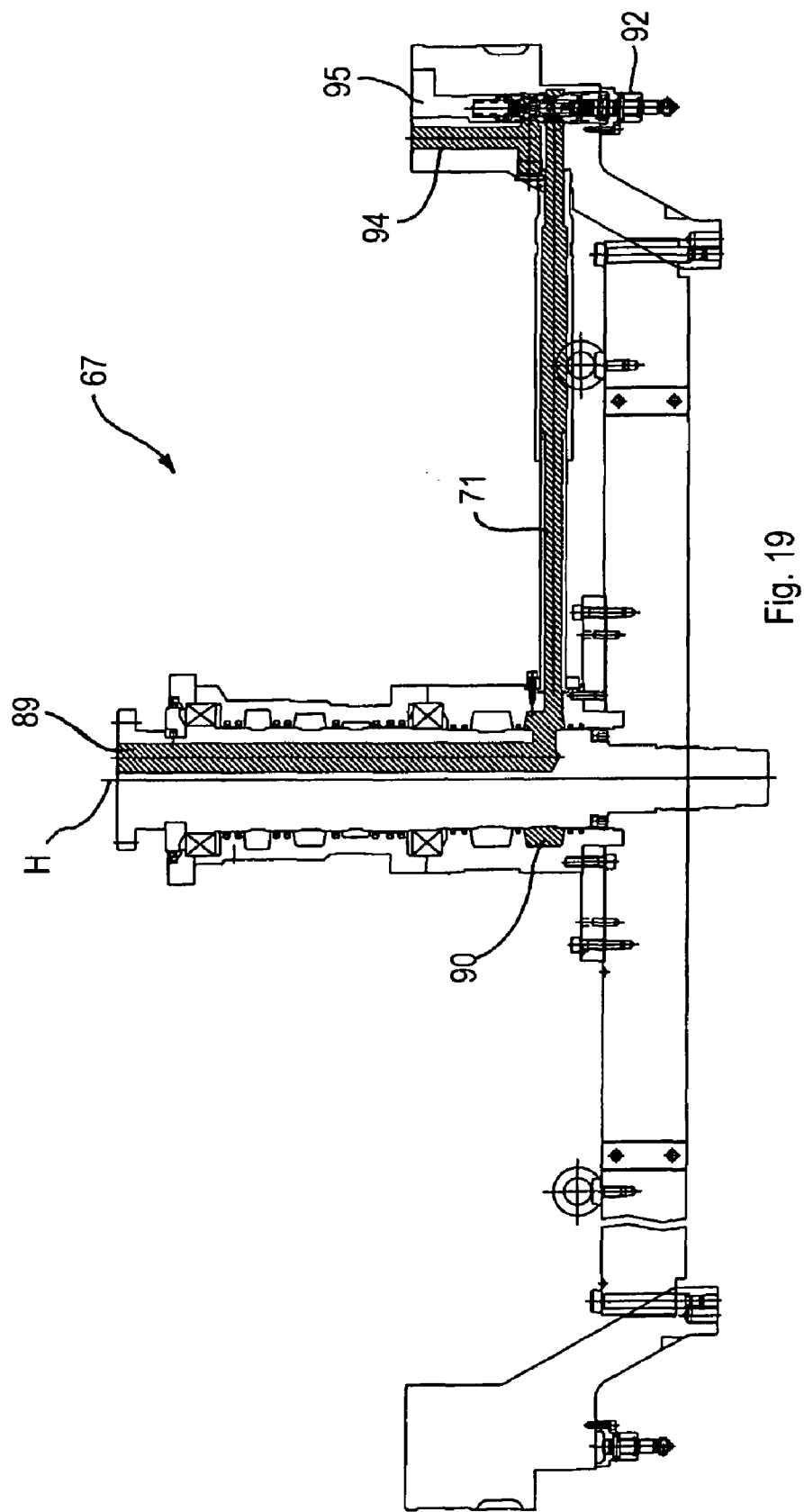
FIG. 19 is a partially sectioned schematic view that shows the further hydraulic circuit arrangement in FIG. 16.

Similarly, the second hydraulic circuit 67, shown in detail in FIGS. 19 and 20, is provided with a second pump that is not shown that sends a second pressurised driving fluid, for example oil, to a second inlet conduit 89 arranged parallel to the rotation axis H. The second inlet conduit 89 leads into a second annular conduit 90, from which a plurality of second distributing conduits 71 lead away. The latter are arranged radially with respect to the second annular conduit 90 and are angularly equidistant around the rotation axis H. Each second distributing conduit 71 is in fluid communication with a plurality of second supply conduits 91 obtained on the carousel 68 transversely to the second distributing conduits 71. The second supply conduits 91 are arranged in the peripheral region of the carousel 68 in which the first supply conduits 84 are obtained, in a more inward position than the latter.

Each second supply conduit 91 is associated with a second valve 92 that enables the second driving fluid to be introduced to a corresponding second actuator that is not shown that is associated with a second mould of the second fraction of moulds.

Each second valve 92 is mounted in a second seat 93, obtained on the carousel 68 and better visible in FIG. 18. The second seats 93 are positioned along a second circumference C2, centred on the rotation axis H and arranged in an internal position with respect to the first circumference C1. The second seats 93 are angularly equidistant along the second circumference C2. The second seats 93 are further arranged in an angularly staggered position around the rotation axis H with respect to the first seats 86.

With each second valve 92 a second connecting conduit 94 is further associated, by means of which the second driving fluid coming from the second valve 92 can be sent to the corresponding second actuator. The second valve 92 is arranged near a second discharge channel 95 for discharging the second driving fluid when the corresponding second mould is opened.

The second hydraulic circuit 67 further comprises second return conduit arrangement 72, shown in FIG. 16, that takes the second driving fluid from the second discharge channel 95 to the second pump.

During operation, a first mould, associated with the first hydraulic circuit 66, is initially in the open position in such a way that a dispensing device for dispensing plastics can introduce a dose 3 of plastics inside it. Whilst the carousel 68 rotates continuously around the rotation axis H, the first valves 85 interact with a first cam arrangement that is not shown that modifies the position of the aforementioned valves along the rotation axis H. In particular, after the first mould has received the dose 3 from the dispensing device, the first cam arrangement positions the corresponding first valve 85 in a driving position, in which the first supply conduit 84 communicates with the first connecting conduit 87. The first driving fluid is thus sent to the corresponding first actuator to move the corresponding second half mould 6 to the first half mould 5, thus shutting the first mould.

As the first mould is closed, a second mould, adjacent to the first mould and arranged in the open position, interacts with the dispensing device to receive in turn a dose of plastics. Subsequently, the second hydraulic circuit 67, in a similar manner to what has been disclosed above regarding the first mould, closes the second mould. Whilst the second hydraulic circuit 67 starts to close the second mould, the first hydraulic circuit 66, since it is independent of the second hydraulic circuit 67, can stop closing the first mould.

In the meantime, the second mould moves away from the dispensing device to enable a third mould, associated with the first hydraulic circuit 66, to be supplied with a respective dose.

After closing the first mould completely, the first driving fluid remains in the first actuator so as to keep the first mould in the closed position, in order to enable the preform that has just been formed to be cooled and the shape thereof to stabilize.

The first pump, having already closed the first mould, can start to send the first driving fluid to the third mould, so as to close the latter in a manner that is completely similar to what has been disclosed above with reference to the first mould.

The second hydraulic circuit 67 can subsequently close a fourth mould, arranged in a position that is adjacent to the third mould, and so on for all the moulds mounted on the carousel 68.

When the first mould has to be taken to the open position, the first cam arrangement positions the first valve 85 in a discharge position in which the first driving fluid contained in the first actuator can be discharged into the first discharge channel 88. This may occur, for example, by making the first connecting conduit 87 communicate with the first discharge channel 88. By so doing, the first mould opens and the corresponding preform can be extracted.

The moulds of the second fraction of moulds can be opened in a completely similar way.

It should be noted that the first mould, like all the other moulds, has an interval of time available within which to close that is twice that of the traditional case, in which a single driving hydraulic circuit is provided. In this latter case, in fact, as a single hydraulic circuit is provided that drives all the moulds, the closing operation of the first mould should be completed before the second mould is closed.

It is possible to provide a number of hydraulic circuits greater than two. A number of hydraulic circuits that is identical to the number of moulds can even be provided so as to drive the latter in a completely autonomous and independent manner from one another, optimising moulding operations.

The invention claimed is:

1. Apparatus for forming an object from a dose of plastics, comprising a punch, a die arrangement provided with a cavity for receiving said dose and with at least two parts reciprocally movable for shaping an outer undercut portion of said object, a chamber arrangement containing at least one fluid for applying a clamping force so as to keep said at least two parts in contact, wherein it further comprises a conduit arrangement for supplying said chamber arrangement with said at least one fluid, said conduit arrangement leading into a first chamber and a second chamber of said chamber arrangement so that said at least one fluid increases discontinuously said clamping force from an initial force applied by means of said first chamber when said dose is substantially contained in said cavity, to a final force applied by means of said second chamber when said at least two parts shape said undercut portion.

2. Apparatus according to claim 1, wherein said first chamber receives, by means of a conduit of said conduit arrangement, a first fluid.

3. Apparatus according to claim 2, wherein said first fluid has in said first chamber, a first pressure that generates said initial force on said at least two parts.

4. Apparatus according to claim 2, wherein said second chamber receives, through a further conduit of said conduit arrangement, a second fluid.

5. Apparatus according to claim 4, wherein said first fluid has in said first chamber, a first pressure that generates said initial force on said at least two parts and said second fluid has, in said second chamber, a second pressure that generates said final force on said at least two parts, said second pressure being greater than said first pressure.

6. Apparatus according to claim 4, wherein said first chamber and said second chamber are arranged inside an internally hollow supporting element, extending along a moulding axis.

7. Apparatus according to claim 6, and further comprising a sleeve member, fixed to an internal transverse surface of said supporting element coaxially to said moulding axis.

8. Apparatus according to claim 7, and further comprising a movable sleeve element, arranged between said sleeve member and a wall of said supporting element and movable along said moulding axis.

9. Apparatus according to claim 8, wherein said movable sleeve element is provided, at a first end, with a first operating surface, transverse to said moulding axis, and delimiting, together with said sleeve member, with said wall and with said internal transverse surface, said second chamber.

10. Apparatus according to claim 9, wherein said movable sleeve element comprises, at a second end opposite said first end, a resting surface suitable for coming into contact with an abutting portion of said sleeve member.

11. Apparatus according to claim 10, wherein said abutting portion extends transversely from said sleeve member to said wall.

12. Apparatus according to claim 10, wherein from said resting surface an appendage projects along said moulding axis which appendage is arranged between said abutting portion and said wall.

13. Apparatus according to claim 12, wherein said movable sleeve element is provided with a second operating surface obtained on said appendage and interposed between said abutting portion and said at least two parts.

14. Apparatus according to claim 1, and further comprising a holding element that can interact with said at least two parts to keep them in contact.

15. Apparatus according to claim 13, and further comprising a holding element that can interact with said at least two parts to keep them in contact wherein said holding element is movable with respect to said supporting element and partially housed therein.

16. Apparatus according to claim 15, wherein said holding element is arranged between said at least two parts and said movable sleeve element.

17. Apparatus according to claim 15, wherein said holding element comprises a contact surface that is transverse to said moulding axis and shaped to interact with said second operating surface.

18. Apparatus according to claim 17, wherein said contact surface together with said wall, with said appendage and with said abutting portion, delimits part of said first chamber.

19. Apparatus according to claim 17, wherein said holding element is provided with a cylindrical portion that projects from said contact surface to said internal transverse surface.

20. Apparatus according to claim 19, wherein on said supporting element a body is fixed coaxially that is surrounded by said sleeve member in such a way as to define a zone of said first chamber inside which said cylindrical portion is received.

21. Apparatus according to claim 19, wherein said holding element comprises a sleeve delimited internally by a frustum-conical surface, arranged on the opposite side to said cylindrical portion, and pushed by said at least one fluid to further frustum-conical surfaces provided on said at least two parts.

22. Apparatus according to claim 15, wherein said holding element is provided with a respective resting surface through which it can rest on an abutment associated with said supporting element.

23. Apparatus according to claim 14, wherein said holding element comprises a suction arrangement for sucking air from said die arrangement when said dose is shaped.

24. Apparatus according to claim 14, wherein said holding element comprises an injecting arrangement for injecting air near said object when said object is extracted from said die arrangement.

25. Apparatus according to claim 24, wherein said holding element comprises a suction arrangement for sucking air from said die arrangement when said dose is shaped, and said injecting arrangement and said suction arrangement comprise a common conduit obtained in said holding element.

26. Apparatus according to claim 1, wherein said at least one fluid comprises a gas.

27. Apparatus according to claim 1, wherein said die arrangement is included in a forming device comprising a plurality of moulds arranged in a peripheral region of a carousel rotatable around a rotation axis.

28. Apparatus according to claim 27, wherein said rotation axis is arranged vertically.

29. Apparatus according to claim 27, wherein each mould of said plurality of moulds is openable and closable by means of a hydraulic device.

30. Apparatus according to claim 29, wherein said hydraulic device comprises a hydraulic circuit arrangement arranged for driving a group of said plurality of moulds.

31. Apparatus according to claim 30, wherein said hydraulic circuit arrangement is provided with a pump.

32. Apparatus according to claim 31, wherein said hydraulic circuit arrangement comprises a delivery conduit arrangement by means of which a pressurised driving fluid is conveyed by said pump to each mould of said group.

33. Apparatus according to claim 32, wherein said delivery conduit arrangement comprises an inlet conduit that is substantially parallel to said rotation axis.

34. Apparatus according to claim 33, wherein said delivery conduit arrangement comprises an annular conduit into which said inlet conduit leads, said annular conduit extending around said rotation axis (H).

35. Apparatus according to claim 34, wherein said delivery conduit arrangement comprises a plurality of distributing conduits that extend radially from said annular conduit.

36. Apparatus according to claim 35, wherein said delivery conduit arrangement comprises a plurality of supply conduits arranged transversely to said distributing conduits in said peripheral region.

37. Apparatus according to claim 32, wherein said hydraulic circuit arrangement comprises a return conduit arrangement by means of which said driving fluid is conveyed from each mould of said group to said pump.

38. Apparatus according to claim 32, wherein said hydraulic circuit arrangement comprises a plurality of valves drivable for sending said driving fluid to corresponding moulds of said group.

39. Apparatus according to claim 38, and further comprising a cam driving arrangement for driving said plurality of valves.

40. Apparatus according to claim 38, wherein said hydraulic circuit arrangement comprises a plurality of connecting conduits interposed between each valve of said plurality of valves and a corresponding mould of said group.

41. Apparatus according to claim 40, wherein said hydraulic circuit arrangement comprises a return conduit arrangement by means of which said driving fluid is conveyed from each mould of said group to said pump, each valve of said plurality of valves is operable between a driving position in which a respective connecting conduit of said plurality of connecting conduits is in fluid communication with said delivery conduit arrangement and a discharge position in which said respective connecting conduit is in fluid communication with a discharging arrangement connected to said return conduit arrangement.

42. Apparatus according to claim 38, wherein the valves of said plurality of valves are positioned along a circumference arranged in said peripheral region.

43. Apparatus according to claim 42, wherein the valves of said plurality of valves are equidistant along said circumference.

44. Apparatus according to claim 30, wherein said hydraulic device comprises a further hydraulic circuit arrangement, that is distinct from said hydraulic circuit arrangement and arranged for driving a further group of said plurality of moulds.

45. Apparatus according to claim 44, wherein said group comprises a half of said plurality of moulds and said further group comprises a further half of said plurality of moulds.

46. Apparatus according to claim 44, wherein each mould of said group is interposed between two consecutive moulds of said further group.

47. Apparatus according to claim 44, wherein said hydraulic circuit arrangement is provided with a pump and said further hydraulic circuit arrangement is provided with a further pump.

48. Apparatus according to claim 47, wherein said further hydraulic circuit arrangement comprises a further delivery conduit arrangement by means of which a further pressurised driving fluid is conveyed by said further pump to each mould of said further group.

49. Apparatus according to claim 48, wherein said further delivery conduit arrangement comprises a further inlet conduit that is substantially parallel to said rotation axis.

50. Apparatus according to claim 49, wherein said further delivery conduit arrangement comprises a further annular conduit into which said further inlet conduit leads, said further annular conduit extending around said rotation axis.

51. Apparatus according to claim 50, wherein said further delivery conduit arrangement comprises a plurality of further distributing conduits that extend radially from said further annular conduit.

52. Apparatus according to claim 51, wherein said further delivery conduit arrangement comprises a plurality of further supply conduits arranged transversely to said further distributing conduits in said peripheral region.

53. Apparatus according to claim 48, wherein said further hydraulic circuit arrangement comprises a further return conduit arrangement by means of which said further driving fluid is conveyed from each mould of said further group to said further pump.

54. Apparatus according to claim 48, wherein said further hydraulic circuit arrangement comprises a plurality of further valves drivable for sending said further driving fluid to corresponding moulds of said further mould.

55. Apparatus according to claim 54, and further comprising a further cam driving arrangement for driving said plurality of further valves.

56. Apparatus according to claim 54, wherein said further hydraulic circuit arrangement comprises a plurality of further connecting conduits interposed between each further valve of said plurality of further valves and a corresponding mould of said further mould.

57. Apparatus according to claim 56, wherein said further hydraulic circuit arrangement comprises a further return conduit arrangement by means of which said further driving fluid is conveyed from each mould of said further group to said further pump, each further valve of said plurality of further valves being operable between a driving position in which a respective further connecting conduit of said plurality of further connecting conduits is in fluid communication with said further delivery conduit arrangement and a discharge position in which said respective further connecting conduit is in fluid communication with a further discharging arrangement connected to said further return conduit arrangement.

58. Apparatus according to claim 54, wherein said hydraulic circuit arrangement is provided with a pump and comprises a delivery conduit arrangement by means of which a pressurised driving fluid is conveyed by said pump to each mould of said group, and further comprises a plurality of valves drivable for sending said driving fluid to corresponding moulds of said group, the valves of said plurality of valves being positioned along a circumference arranged in said peripheral region, the further valves of said plurality of further valves being positioned along a further circumference arranged in said peripheral region.

59. Apparatus according to claim 58, wherein the further valves of said plurality of further valves are equidistantly spaced along said further circumference.

60. Apparatus according to claim 58, wherein said circumference and said further circumference are concentric.

61. Apparatus according to claim 60, wherein said further circumference is arranged inside said circumference.

62. Apparatus according to claim 58, wherein the valves of said plurality of valves are angularly staggered with respect to the further valves of said plurality of further valves.

63. Apparatus according to claim 27, wherein said forming device is shaped in such a way as to obtain a container preform by compression moulding said dose.

64. Apparatus according to claim 1, wherein said at least two parts are movable with respect to one another along a substantially rectilinear trajectory.

65. Apparatus according to claim 1, wherein said at least two parts comprise a first part and a second part.

66. Apparatus according to claim 65, wherein said first part and said second part are mounted on a carnage movable parallel to an approach direction along which said die arrangement and said punch move relative to one another for shaping said dose.

67. Apparatus according to claim 66, wherein said carriage is slidingly drivable along a guiding arrangement parallel to said approach direction through a driving bar.

68. Apparatus according to claim 67, wherein said first part and said second part are fixed respectively to a first supporting element and to second supporting element.

69. Apparatus according to claim 68, wherein said at least two parts are movable with respect to one another along a substantially rectilinear trajectory and said first supporting element and said second supporting element comprise respectively a first sliding portion and a second sliding portion, that are movable with respect to one another parallel to said trajectory.

70. Apparatus according to claim 69, wherein said first part and said second part are mounted on a carriage movable parallel to an approach direction along which said die arrangement and said punch move relative to one another for shaping said dose, said first sliding portion and said second sliding portion being slidingly movable along a bar of said carriage, arranged transversely to said approach direction.

71. Apparatus according to claim 70, wherein said first sliding portion and said second sliding portion are provided with respective rollers, rotatable around respective rotation axes arranged transversely to said bar and to said approach direction.

72. Apparatus according to claim 71, wherein said rotation axes are substantially orthogonal to said bar and to said approach direction.

73. Apparatus according to claims 65, wherein said at least two parts are movable with respect to one another along a substantially rectilinear trajectory and said apparatus further comprises a cam profile for driving said first part and said second part along said trajectory.

74. Apparatus according to claim 71, wherein said at least two parts are movable with respect to one another along a substantially rectilinear trajectory and said apparatus further comprises a cam profile for driving said first part and said second part along said trajectory, said cam profile comprising a pair of tracks along which said rollers can run and which are arranged symmetrically with respect to a plane parallel to said approach direction.

75. Apparatus according to claim 65, and further comprising a positioning arrangement for positioning said first part in a contact position in which said undercut portion can be shaped.

76. Apparatus according to claim 70, and further comprising a positioning arrangement for positioning said first part in a contact position in which said undercut portion can be shaped, said positioning arrangement comprising a projection that projects transversely from said bar so that said first sliding portion can abut against said projection in said contact position.

77. Apparatus according to claim 76, wherein said projection projects from an intermediate portion of said bar substantially orthogonally to a longitudinal axis of said bar.

78. Apparatus according to claim 76, wherein said positioning arrangement comprises an elastic element arranged for pushing said first sliding portion against said projection in said contact position.

79. Apparatus according to claim 78, wherein said elastic element comprises a helical spring wound around said bar.

80. Apparatus according to claim 75, and further comprising a pressing element arranged for pushing said second part against said first part in said contact position.

81. Apparatus according to claim 78, and further comprising a pressing element arranged for pushing said second part against said first part in said contact position, wherein said pressing element comprises a further elastic element having stiffness less than said elastic element.

82. Apparatus according to claim 81, wherein said further elastic element comprises a further helical spring wound around said bar.

83. Apparatus according to claim 76, wherein, in said contact position, between said second sliding portion and said projection a gap is defined.

84. Method comprising the following steps:
inserting a dose of plastics in a cavity of a die arrangement;
forming an object from said dose between said die arrangement and a punch, said forming comprising shaping an outer undercut portion of said object between at least two reciprocally movable parts of said die arrangement;
applying a clamping force to said at least two reciprocally movable parts for keeping them in contact during said forming, said clamping force being generated by at least one fluid supplied through a conduit arrangement to a chamber arrangement having a first chamber and a second chamber;
wherein said at least one fluid increases discontinuously said clamping force from an initial force applied by means of said first chamber when said dose is substantially contained in said cavity to a final force applied by means of said second chamber when said at least two reciprocally movable parts shape said outer undercut portion.

85. Method according to claim 84, wherein said initial force and said final force are substantially constant.

* * * * *